(12) United States Patent
Saitou et al.

(10) Patent No.: US 11,919,366 B2
(45) Date of Patent: Mar. 5, 2024

(54) VEHICLE HEATING DEVICE, AND VEHICLE PROVIDED WITH VEHICLE HEATING DEVICE

(71) Applicants: Panasonic Intellectual Property Management Co., Ltd., Osaka (JP); JAPAN CLIMATE SYSTEMS CORPORATION, Hiroshima (JP)

(72) Inventors: Kensaku Saitou, Tokyo (JP); Kou Komori, Nara (JP); Mio Furui, Osaka (JP); Yu Nakashima, Osaka (JP); Hiroshi Hamamoto, Hiroshima (JP); Yoichi Miyazaki, Hiroshima (JP); Hideaki Nishii, Hiroshima (JP); Hiroaki Shigenaka, Hiroshima (JP)

(73) Assignees: PANASONIC INTELLECTUAL PROPERTY MANAGEMENT CO., LTD., Osaka (JP); JAPAN CLIMATE SYSTEMS CORPORATION, Hiroshima (JP)

( * ) Notice: Subject to any disclaimer, the term of this patent is extended or adjusted under 35 U.S.C. 154(b) by 798 days.

(21) Appl. No.: 17/036,211

(22) Filed: Sep. 29, 2020

(65) Prior Publication Data
US 2021/0008960 A1 Jan. 14, 2021

Related U.S. Application Data

(63) Continuation of application No. PCT/JP2019/004904, filed on Feb. 12, 2019.

(30) Foreign Application Priority Data

Mar. 30, 2018 (JP) ................................. 2018-068786

(51) Int. Cl.
*B60H 1/00* (2006.01)
*B60H 1/22* (2006.01)

(52) U.S. Cl.
CPC ..... *B60H 1/00742* (2013.01); *B60H 1/00207* (2013.01); *B60H 1/00285* (2013.01);
(Continued)

(58) Field of Classification Search
None
See application file for complete search history.

(56) References Cited

U.S. PATENT DOCUMENTS

| 2012/0234932 A1 | 9/2012 | Okamoto et al. |
| 2015/0168219 A1* | 6/2015 | Itoh ........................ G01J 5/0806 |
| | | 250/338.3 |

(Continued)

FOREIGN PATENT DOCUMENTS

| FR | 3040658 | 3/2017 |
| JP | 58-104717 | 7/1983 |

(Continued)

OTHER PUBLICATIONS

Official Communication issued in International Patent Application No. PCT/JP2019/004904, dated Apr. 2, 2019, along with English language translation thereof.

(Continued)

*Primary Examiner* — Paul B Yanchus, III
(74) *Attorney, Agent, or Firm* — Greenblum & Bernstein, P.L.C.

(57) ABSTRACT

A target thermal sensation setter sets target thermal sensations for a finite number of parts into which the occupant is virtually divided. A cabin temperature controller individually controls a cabin air-conditioning unit and an auxiliary heater so that the thermal sensations of the respective parts of the occupant estimated by an occupant thermal sensation estimator fall within a range of the target thermal sensations.

12 Claims, 14 Drawing Sheets

(52) U.S. Cl.
CPC ....... *B60H 1/00428* (2013.01); *B60H 1/0075* (2013.01); *B60H 1/00785* (2013.01); *B60H 1/00878* (2013.01); *B60H 1/2218* (2013.01); *B60H 2001/00128* (2013.01); *B60H 2001/00228* (2013.01)

(56) References Cited

U.S. PATENT DOCUMENTS

| | | |
|---|---|---|
| 2017/0080779 A1 | 3/2017 | Sagou et al. |
| 2017/0334263 A1 | 11/2017 | Schumacher et al. |
| 2017/0368907 A1 | 12/2017 | Yoneda et al. |
| 2018/0251007 A1 | 9/2018 | Neveu et al. |
| 2019/0375271 A1 | 12/2019 | Neveu et al. |

FOREIGN PATENT DOCUMENTS

| | | |
|---|---|---|
| JP | 02-054620 | 4/1990 |
| JP | 07-172147 | 7/1995 |
| JP | 2009-178247 | 8/2009 |
| JP | 2012-192827 | 10/2012 |
| JP | 2012-192829 | 10/2012 |
| JP | 2015-223917 | 12/2015 |
| JP | 2018-004241 | 1/2018 |
| WO | 2016/070047 | 5/2016 |

OTHER PUBLICATIONS

Extended European Search Report from European Patent Office (EPO) in European Patent Appl. No. 19777876.4, dated Apr. 23, 2021.

\* cited by examiner

VEHICLE HEATING DEVICE, AND VEHICLE PROVIDED WITH VEHICLE HEATING DEVICE

CROSS-REFERENCE TO RELATED APPLICATIONS

This is a continuation of International Application No. PCT/JP2019/004904 filed on Feb. 12, 2019, which claims priority to Japanese Patent Application No. 2018-068786 filed on Mar. 30, 2018. The entire disclosures of these applications are incorporated by reference herein.

BACKGROUND

The present invention relates to, for example, a vehicle heater provided for an automobile or any other vehicle and a vehicle including the vehicle heater, more particularly belongs to the technical field of means for estimating thermal sensations of an occupant.

An automobile has been equipped with a cabin air-conditioning unit configured to condition air in the cabin using air-conditioned wind blowing out of the outlets in the cabin. The cabin air-conditioning unit includes a refrigeration-cycle system, a heater core through which a coolant for an engine circulates, and a blower, and is configured to exchange heat between air-conditioning air delivered by the blower and a refrigerant circulating through the refrigeration-cycle system or the engine coolant circulating through the heater core to provide air-conditioned wind having a desired temperature. In addition, a heat pump system of an electric vehicle or any other vehicle that does not include the heater core conditions air in the cabin.

Further, it has been considered to equip an automobile with a direct warmer directly warming an occupant, a radiant warmer warming the occupant by radiant heat, and any other similar unit, in addition to the cabin air-conditioning unit, and the cabin air-conditioning unit and the direct warmer or the radiant warmer may perform control in cooperation with each other. As an example of the direct warmer, there is a seat heater disclosed in Japanese Unexamined Patent Publication No. 2009-178247, for example. In Japanese Unexamined Patent Publication No. 2009-178247, the seat heater includes a plurality of heater units, and is configured to, in the initial mode, maximize the outputs of a thigh heater unit and a buttock heater unit, and, when a cabin air-conditioning unit becomes not in the full hot state, or the seat surface temperature reaches a target temperature, switch the initial mode to the steady mode to lower the outputs of the heater units.

As an example of the radiant warmer, there is a heater configured to heat foot atmosphere of an occupant, disclosed in Japanese Unexamined Patent Publication Nos. 2012-192827 and 2012-192829, for example. The apparatus of Japanese Unexamined Patent Publication Nos. 2012-192827 and 2012-192829 is attached to the wall under the steering column around the top of the feet of the occupant, and is configured to perform control such that a cabin air-conditioning unit and a radiant warmer are actuated in the initial mode of heating, and when the cabin is getting warm and the required temperature of the blowing air-conditioned wind decreases, the surface temperature of the radiant warmer is lowered in proportion to the decrease in the required temperature.

SUMMARY

As in Japanese Unexamined Patent Publication Nos. 2009-178247, 2012-192827, and 2012-192829, the combined use of the direct warmer or the radiant warmer, which raise the temperature faster than the heater core, with the cabin air-conditioning unit allows the fast heating performance in the initial mode of heating to be improved.

However, when the direct warmer or the radiant warmer is kept operating at the time when the temperature of the air-conditioned wind blown out of the cabin air-conditioning unit is high after some time elapsed from the start of heating, the occupant may feel too hot and uncomfortable in terms of thermal sensation.

To address this matter, in Japanese Unexamined Patent Publication No. 2009-178247, the outputs of the thigh heater unit and the buttock heater unit are maximized in the initial mode of heating, and when the cabin air-conditioning unit becomes not in the full hot state, or the temperature on the surface of the seat reaches the target temperature, the outputs of the respective heater units are lowered. However, in some respects, the control based on the timing when the cabin air-conditioning unit becomes not in the full hot state, and the control based on the timing when the temperature on the surface of the seat raises to the target temperature are not reflecting the thermal sensations of the occupant. It is conceivable that the occupant has to manually turn off the direct warmer or the radiant warmer when the occupant feels too hot.

Further, in Japanese Unexamined Patent Publication Nos. 2012-192827 and 2012-192829, when the required temperature of air blowing out of the cabin air-conditioning unit decreases, the surface temperature of the radiant warmer is lowered in proportion to the decrease in the required temperature of the air, but this control is not reflecting the thermal sensations of the occupant in some respects, either.

Specifically, although the apparatus of Japanese Unexamined Patent Publication Nos. 2009-178247, 2012-192827, and 2012-192829 is capable of improving the fast heating performance in the initial mode of heating, it has been desired to provide further improvements in terms of achieving both of the fast heating performance and the comfort after certain time elapsed since the start of heating (after stabilization).

In view of the foregoing background, it is therefore an object of the present invention to achieve both of the fast heating performance and the comfort while enhancing energy conservation when the cabin air-conditioning unit is controlled in combination with the direct warmer or the radiant warmer.

In order to achieve the aforementioned object, a first aspect of the invention is directed to a vehicle heater including a cabin air-conditioning unit configured to produce air-conditioned wind blowing out of an outlet in a cabin and to condition air in the cabin using the air-conditioned wind. The vehicle heater includes: an auxiliary heater including at least one of a direct warmer positioned to correspond to a part of an occupant in contact therewith and configured to directly warm the occupant, or a radiant warmer positioned to be apart from the occupant and configured to warm the occupant by radiant heat; a cabin condition detector configured to sense or estimate at least one cabin condition of a temperature condition inside the cabin, a humidity condition inside the cabin, an airflow condition inside the cabin, or a solar radiation condition inside the cabin; an operation state detector configured to detect operation states of the cabin air-conditioning unit and the auxiliary heater; a target thermal sensation setter configured to set target thermal sensations for a finite number of parts into which the occupant is virtually divided; an occupant thermal sensation estimator configured to quantitatively estimate the thermal sensations of the respective parts of the occupant based on the cabin condition sensed or estimated by the cabin condition detector, and the operation states of the cabin air-conditioning unit and the auxiliary heater detected by the operation state detector; and a cabin temperature controller configured to individually control the cabin air-conditioning unit and the auxiliary heater so that the thermal sensations of the respective parts estimated by the occupant thermal sensation estimator fall within a range of the target thermal sensations set by the target thermal sensation setter.

According to this configuration, air-conditioned wind produced by the cabin air-conditioning unit blows out of the outlets in the cabin. Thus, the air-conditioned wind allows air in the cabin to be conditioned. Further, when the auxiliary heater includes the direct warmer, the direct warmer directly warms a part of the occupant in contact therewith. When the auxiliary heater includes the radiant warmer, the radiant warmer warms the occupant by radiant heat. Accordingly, for example, in the initial mode of heating, it is possible to combine heating of air-conditioned wind by the cabin air-conditioning unit with heating by the direct warmer or the radiant warmer. Thus, the fast heating performance is improved.

During heating, the cabin condition detector senses or estimates at least one cabin condition of a temperature condition inside the cabin, a humidity condition inside the cabin, an airflow condition inside the cabin, or a solar radiation condition inside the cabin. Further, the operation state detector detects operation states of the cabin air-conditioning unit and the auxiliary heater. The occupant thermal sensation estimator quantitatively estimates the thermal sensations of the respective parts of the occupant based on the cabin condition and the operation states of the cabin air-conditioning unit and the auxiliary heater. Specifically, for example, if the cabin air-conditioning unit is in heating operation and the auxiliary heater is on while the temperature condition inside the cabin is being high, it can be estimated that the parts of the occupant are warm and the thermal sensations are higher. If the temperature condition inside the cabin is low, it can be estimated that the thermal sensations are low. If the humidity condition inside the cabin is high, it can be estimated that the thermal sensations are higher than in the case in which the humidity condition inside the cabin is low. Further, for example, if the airflow in the cabin is fast and the cabin air-conditioning unit is in heating operation, it can be estimated that the heating is on high and the thermal sensations are high. Further, for example, if the cabin air-conditioning unit is in heating operation and the auxiliary heater is on while solar radiation is intense, it can be estimated that the thermal sensations are high.

This estimation of the thermal sensations can be performed for each of the parts of the occupant. For example, if the auxiliary heater is a direct warmer positioned to correspond to buttocks of the occupant, and the direct warmer is on, it can be estimated that the thermal sensation of the buttocks of the occupant is high. Further, for example, if the auxiliary heater is a radiant warmer positioned near feet of the occupant, and the radiant warmer is on, it can be estimated that the thermal sensation of the feet is high.

On the other hand, the target thermal sensation setter sets target thermal sensations for respective parts of the occupant. For example, the target thermal sensation setting unit may detect the temperature of the cabin air-conditioning unit set by the occupant and adjust the target thermal sensations so that the occupant does not feel hot or cold. This allows the comfort to be enhanced.

The cabin temperature controller individually controls the cabin air-conditioning unit and the auxiliary heater so that the thermal sensations of the respective parts of the occupant estimated by the occupant thermal sensation estimator fall within a range set by the target thermal sensation setter. For example, if it is estimated that the thermal sensations of the respective parts of the occupant are high, the heating by the cabin air-conditioning unit and the auxiliary heater is turned down so that the thermal sensations reach target thermal sensations. On the other hand, if it is estimated that the thermal sensations of the respective parts of the occupant are low, the heating by the cabin air-conditioning unit and the auxiliary heater is turned up so that the thermal sensations reach target thermal sensations. This leads to the controls reflecting the thermal sensations of the respective parts of the occupant, and to favorable thermal sensations of all parts of the occupant.

Further, the controls can be performed individually by turning down only the heating of the cabin air-conditioning unit to turn up the heating of the auxiliary heater, for example.

The vehicle heater according to a second aspect includes: a heating energy consumption detector configured to detect heating energy consumptions of the cabin air-conditioning unit and the auxiliary heater, wherein the cabin temperature controller is configured to control, if the thermal sensations of the respective parts estimated by the occupant thermal sensation estimator fall within the range set by the target thermal sensation setter, the cabin air-conditioning unit and the auxiliary heater so that a sum of the heating energy consumptions detected by the heating energy consumption detector becomes the lowest.

This configuration allows the sum of heating energy consumptions of the cabin air-conditioning unit and the auxiliary heater to be reduced while maintaining the thermal sensations of the respective parts of the occupant to be favorable, thereby allowing efficient heating.

In the vehicle heater according to a third aspect of the invention, the cabin temperature controller is configured to control, if the thermal sensation of at least one part among the thermal sensations of the respective parts estimated by the occupant thermal sensation estimator exceeds the range set by the target thermal sensation setter, the cabin air-conditioning unit so as to reduce the heating energy consumption of the cabin air-conditioning unit, and control the auxiliary heater so as to increase the heating energy consumption of the auxiliary heater.

Specifically, for example, after the initial mode of heating, the thermal sensation of at least one part of the occupant may exceed the range set by the target thermal sensation setter. At this time, since the cabin has been warmed up to some extent, the heating energy consumptions can be reduced while maintaining the target thermal sensations by actively using the auxiliary heater being the direct warmer or the radiant warmer, which more efficiently performs heating than heating by air-conditioned wind blowing out of the cabin air-conditioning unit.

In the vehicle heater of a fourth aspect of the invention, the parts include a near part to and a distal part from the outlet of the cabin air-conditioning unit, and the cabin temperature controller is configured to control the cabin air-conditioning unit and the auxiliary heater so that the thermal sensation of the distal part from the outlet falls within the range set by the target thermal sensation setter.

Specifically, the air-conditioned wind is more difficult to reach the distal part from the outlet than the near part among the parts of the occupant, and thus, the thermal sensations of the distal part tend to be lower. However, in this aspect of the invention, the cabin air-conditioning unit and the auxiliary heater are controlled based on the thermal sensation of the distal part from the outlet. This allows comfort to be further enhanced without reducing the thermal sensation of any part.

In the vehicle heater of a fifth aspect of the invention, the parts include a near part to and a distal part from the outlet of the cabin air-conditioning unit, and the cabin temperature controller is configured to control the cabin air-conditioning unit and the auxiliary heater so that the thermal sensation of the near part to the outlet falls within the range set by the target thermal sensation setter.

Specifically, during the heating operation by the cabin air-conditioning unit, the thermal sensation of the near part to the outlet tends to be higher than that of the distal part among the parts of the occupant. However, in this aspect of the invention, the cabin air-conditioning unit and the auxiliary heater are controlled based on the thermal sensation of the near part to the outlet. This allows comfort to be further enhanced without increasing the thermal sensation of any part.

In the vehicle heater according to a sixth aspect of the invention, the parts include a near part to and a distal part from the outlet of the cabin air-conditioning unit, and the cabin temperature controller is configured to control a volume of air-conditioned wind delivered from the cabin air-conditioning unit in accordance with the thermal sensation of the distal part from the outlet, and control a temperature of the air-conditioned wind delivered from the cabin air-conditioning unit in accordance with the thermal sensation of the near part to the outlet.

With this configuration, the volume of the air-conditioned wind is controlled in accordance with the thermal sensation of the distal part from the outlet among the parts of the occupant, and the temperature of the air-conditioned wind is controlled in accordance with the near part to the outlet among the parts of the occupant. This allows the heating energy consumptions to be reduced while reducing variations of the thermal sensations of the parts.

In the vehicle heater according to a seventh aspect of the invention, the outlet of the cabin air-conditioning unit includes a lower-body-side outlet for allowing air-conditioned wind to blow toward a part of the lower body or the entire lower body of the occupant therethrough and an upper-body-side outlet for allowing the air-conditioned wind to blow toward a part of the upper body or the entire upper body of the occupant therethrough, the occupant thermal sensation estimator is configured to estimate thermal sensations of upper and lower bodies of the occupant, and the cabin temperature controller is configured to change volumes of air-conditioned winds blowing out of the upper-body-side outlet and the lower-body-side outlet in accordance with the thermal sensations of the upper and lower bodies estimated by the occupant thermal sensation estimator.

This configuration allows the thermal sensations of the upper and lower bodies of the occupant to be optimized by the volumes of the air-conditioned winds blowing out of the respective outlets. This allows the heating energy consumptions to be reduced while reducing variations of the thermal sensations of the parts of the upper and lower bodies of the occupant.

In the vehicle heater according to an eighth aspect of the invention, the occupant thermal sensation estimator is configured to estimate the thermal sensations of the respective parts of the occupant based on estimated values of skin temperatures of the respective parts of the occupant.

This configuration allows the thermal sensations to be estimated more accurately than the direct estimation of the thermal sensations from the operation states of the cabin air-conditioning unit and the auxiliary heater.

In the vehicle heater according to a ninth aspect of the invention, the occupant thermal sensation estimator is configured to estimate the thermal sensations of the respective parts of the occupant based on measured values of skin temperatures of the respective parts of the occupant.

In the vehicle heater according to a tenth aspect of the invention, the cabin temperature controller is configured to control the cabin air-conditioning unit so that the temperature of air-conditioned wind blowing out of the outlet becomes equal to or greater than the estimated or measured values of the skin temperatures.

This configuration allows heating energy consumptions to be reduced while maintaining comfortable thermal sensations, by bringing the temperature of the air-conditioned wind blowing out of the outlet to be equal to or higher than the estimated or measured value of the skin temperature of the occupant.

In the vehicle heater according to an eleventh aspect of the invention, the auxiliary heater is a seat heater system, which is incorporated into a vehicle seat and includes the direct warmer and the radiant warmer.

With this configuration, two kinds of warmers can be incorporated in the vehicle seat. This allows an influence on interior design in the case of providing both the direct warmer and the radiant warmer to be reduced, and the number of components to be assembled to a vehicle body to be avoided from increasing.

In the vehicle heater according to a twelfth aspect of the invention, the cabin temperature controller sets respective output upper limit values for the direct warmer and the radiant warmer, and the output upper limit value of the direct warmer is lower than that of the radiant warmer.

With this configuration, the output upper limit value of the direct warmer is lower than that of the radiant warmer. This allows the occupant to be warmed up while enhancing safety by avoiding a low-temperature burn of the occupant.

A vehicle including the vehicle heater of any one of the first to twelfth aspects may be configured.

According to the present invention, the cabin air-conditioning unit and the auxiliary heater are individually controlled so that the thermal sensations of the respective parts of the occupant estimated by the occupant thermal sensation estimator fall within a range set by the target thermal sensation setter. This allows fast heating performance and comfort after stabilization to be achieved both while enhancing energy conservation.

DETAILED DESCRIPTION

Embodiment of the present invention will be described in detail with reference to the drawings. The following description of preferred embodiment is a mere example in nature, and is not intended to limit the scope, applications or use of the present invention.

(Configuration of Automobile 1)

Figure 1:
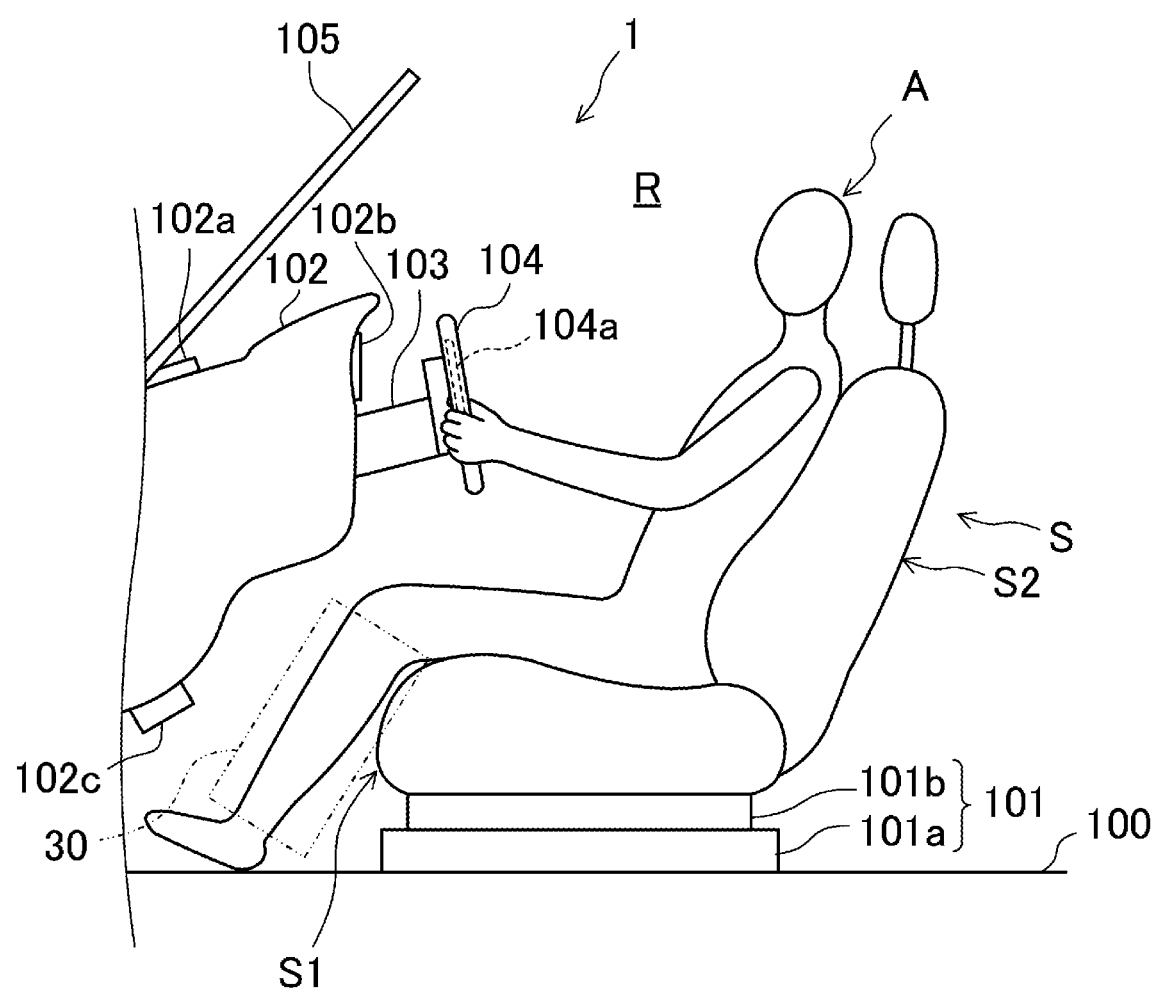
FIG. 1 is a side view illustrating a portion of the inside of the cabin of an automobile according to an embodiment of the present invention.

FIG. 1 is a side view of a portion of the inside of the cabin R of an automobile 1 according to an embodiment of the present invention. In the following description, the terms "front," "forward," and derivatives thereof refer to the front side of a vehicle in the longitudinal direction of the vehicle, the terms "rear," "rearward," and derivatives thereof refer to the rear side of the vehicle in the longitudinal direction of the vehicle, the terms "left," "leftward," and derivatives thereof refer to the left side of the vehicle in the lateral direction of the vehicle, and the terms "right," "rightward," and derivatives thereof refer to the right side of the vehicle in the lateral direction of the vehicle.

A vehicle seat S is attached to a floor panel 100 inside the cabin R with a sliding device 101 interposed therebetween. A front end portion of the cabin R includes an instrument panel 102 including instruments (not shown). A steering column 103 is provided on a portion of the instrument panel 102 near the driver's seat to protrude rearward. A rear end portion of the steering column 103 is provided with a steering wheel 104 facing an occupant A.

The sliding device 101 includes a rail member 101a fixed to the floor panel 100 and extending in the longitudinal direction, a guided member 101b fixed to a lower portion of the vehicle seat S and guided in the longitudinal direction by the rail member 101a, and a lock member (not shown) fixing the guided member 101b to the rail member 101a at a desired position.

The front end portion of the cabin R is provided with a windshield glass 105. A lower end portion of the windshield glass 105 is located near the front end portion of the instrument panel 102.

A front end portion of an upper surface of the instrument panel 102 has a defroster outlet 102a. The defroster outlet 102a faces the inner surface of the windshield glass 105, and extends over a predetermined area in the lateral direction. The defroster outlet 102a is an opening for allowing air-conditioned wind to blow toward the inner surface of the windshield glass 105 therethrough. A rear portion of the instrument panel 102 has vent outlets 102b (upper-body-side outlets) for allowing air-conditioned wind to blow toward a part of the upper body or the entire upper body of the occupant A therethrough. The respective vent outlets 102b are formed on both right and left sides of the instrument panel 102 and a central portion thereof in the lateral direction, and face the driver in the driver's seat and the occupant next to the driver. A lower portion of the instrument panel 102 has heat outlets (lower-body-side outlets) 102c for allowing air-conditioned wind to blow toward a part of the lower body or the entire lower body of the occupant A therethrough. The respective heat outlets 102c can open near the feet of the driver in the driver's seat and the occupant next to the driver, and can be referred to also as "foot-side outlets." Although not shown, vent outlets and heat outlets may be provided also for rear-seat occupants.

Figure 2:
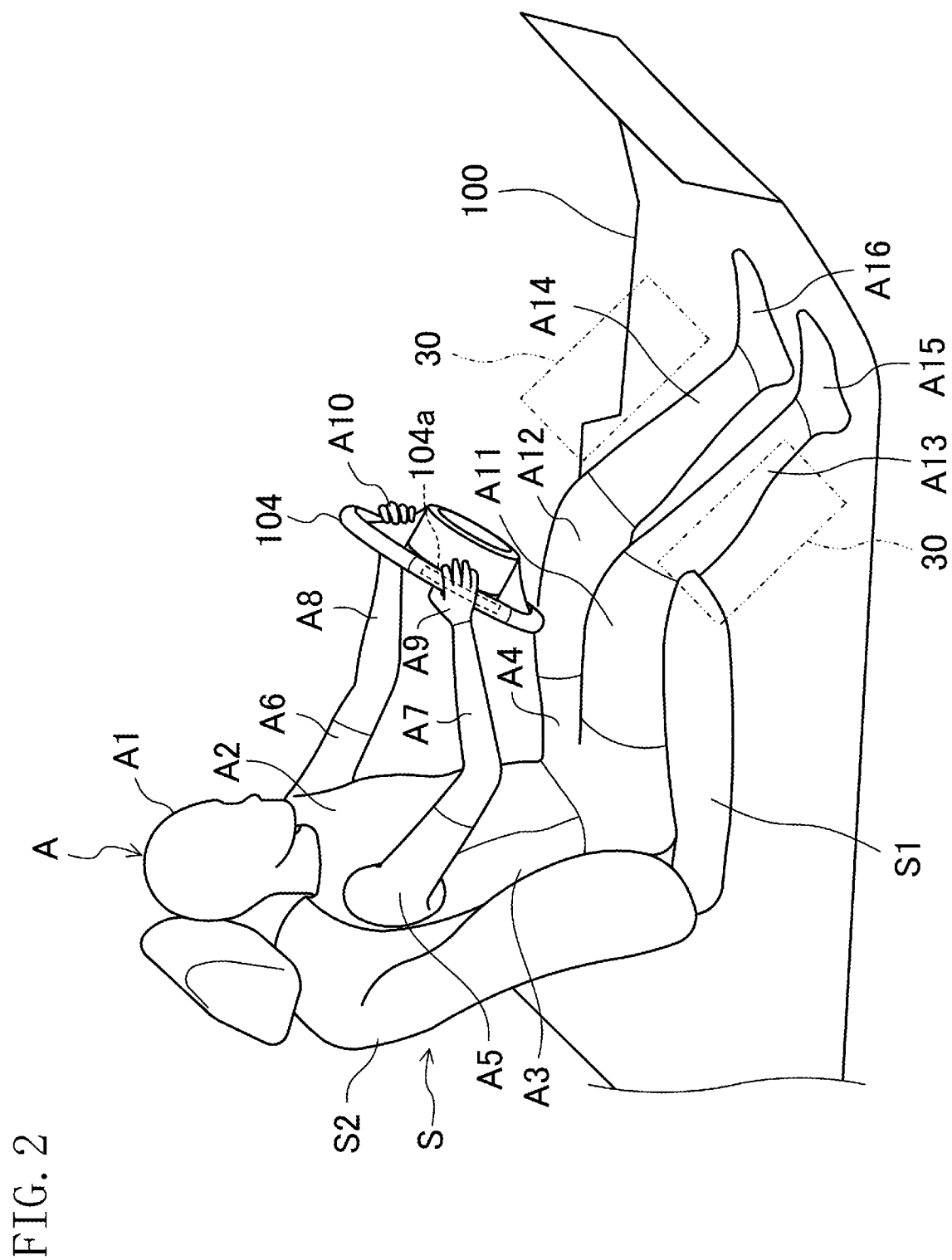
FIG. 2 is a perspective view illustrating a portion of the cabin near the driver's seat.
Figure 3:
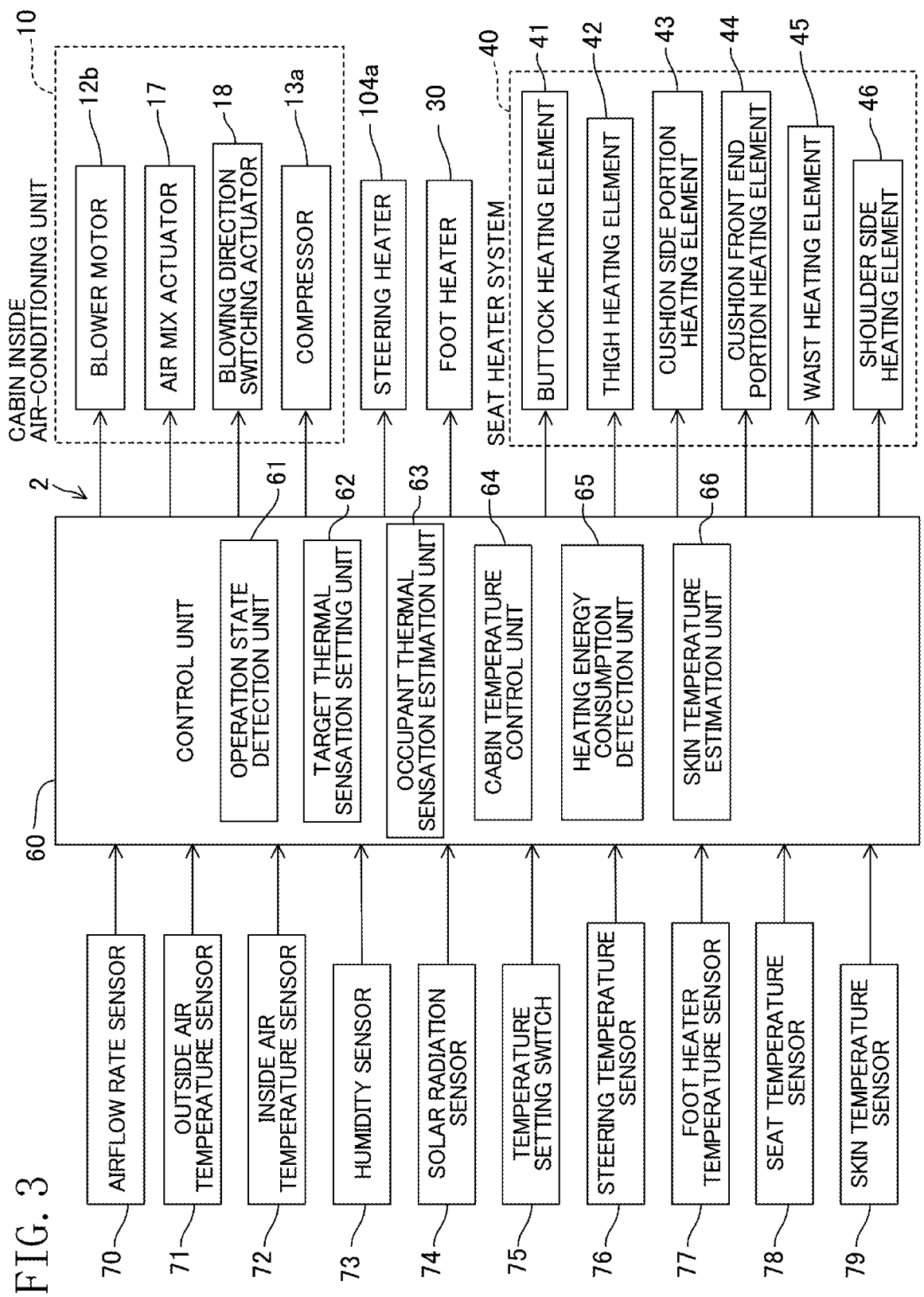
FIG. 3 is a block diagram of a vehicle heater.

The automobile 1 includes a vehicle heater 2 shown in the block diagram of FIG. 3. The vehicle heater 2 includes a cabin air-conditioning unit 10 (shown in FIG. 4), steering heaters 104a (shown in FIGS. 1 and 2), foot heaters 30 (shown in FIGS. 1 and 2), a seat heater system 40 (shown in FIG. 5), and a control unit 60 (shown in FIG. 3). The vehicle heater 2 of this embodiment is configured to be capable of not only heating but also cooling the cabin R, but may be configured so as not to cool the cabin R. In this embodiment, the description is made based on the case in which the foot heaters 30 are radiant warmers. However, the radiant warmers are not limited by the foot heaters 30, and may be positioned near the shoulders of the occupant, for example.

Note that the automobile 1 may be a passenger car, or may be a loaded vehicle, such as a truck. These are exemplary vehicles, and a vehicle except an automobile may be equipped with the vehicle heater 2.

(Configuration of Cabin Air-Conditioning Unit 10)

Figure 4:
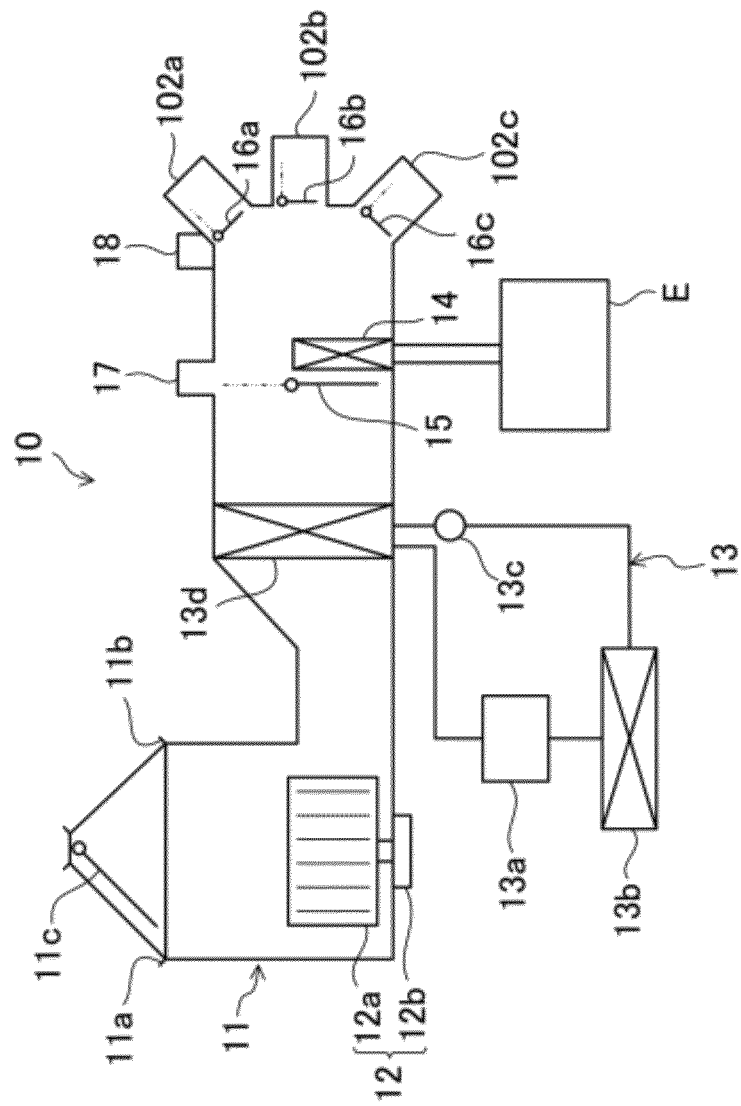
FIG. 4 is a schematic diagram of a configuration of a cabin air-conditioning unit.

The cabin air-conditioning unit 10 is configured to produce air-conditioned wind blowing out of the defroster outlet 102a, the vent outlets 102b, and the heat outlets 102c in the cabin R, and to control air conditioning in the cabin R using the air-conditioned wind. Specifically, as shown in FIG. 4, the cabin air-conditioning unit 10 includes an air-conditioning casing 11, a blower 12, a refrigeration-cycle system 13, a heater core 14, an air mixing damper 15, blowing direction switching dampers 16a, 16b, and 16c, an air mix actuator 17, and a blowing direction switching actuator 18.

The air-conditioning casing 11 has an inside air inlet 11a which communicates with the cabin R and through which air (inside air) in the cabin R is taken in the air-conditioning casing 11, and an outside air inlet 11b which communicates with the outside of the cabin R and through which air (outside air) outside the cabin is taken in the air-conditioning casing 11. The air-conditioning casing 11 includes therein an inside/outside air switching damper 11c operating to close one of the inside air inlet 11a or the outside air inlet 11b and open the other one of these inlets. If the inside/outside air switching damper 11c operates to open the inside air inlet 11a and to close the outside air inlet 11b, an operation is performed in an inside-air circulation mode. On the other hand, if the inside/outside air switching damper 11c operates to close the inside air inlet 11a and to open the outside air inlet 11b, an operation is performed in an outside-air introduction mode. The occupant A may manually switch the operation mode between the inside-air circulation mode and the outside-air introduction mode. Alternatively, a control unit 60 described below may automatically switch the operation mode therebetween.

The blower 12 includes a sirocco fan (centrifugal fan) 12a disposed inside the air-conditioning casing 11, and a blower motor 12b that rotationally drives the sirocco fan 12a. The sirocco fan 12a rotationally driven by the blower motor 12b allows air-conditioning air to be taken in the air-conditioning casing 11 through the inside air inlet 11a or the outside air inlet 11b. The air-conditioning air taken in the air-conditioning casing 11 is delivered toward the downstream side of the air-conditioning casing 11. Note that the type of blower 12 is merely an example. The blower 12 may be a blower including a fan except a centrifugal fan.

As shown in FIG. 3, the blower motor 12b is connected to the control unit 60. The control unit 60 turns the blower motor 12b on and off, and changes the rotational speed of the blower motor 12b per unit time. Increasing the rotational speed of the blower motor 12b per unit time increases the volume of air delivered by the blower 12.

As shown in FIG. 4, the refrigeration-cycle system 13 includes a compressor 13a, a condenser 13b, an expansion valve 13c, and an evaporator 13d, which are connected together through refrigerant pipes to allow a refrigerant to circulate therethrough. The compressor 13a is driven by an engine E (shown only in FIG. 4). A clutch (not shown) of the compressor 13a is controlled by the control unit 60 shown in FIG. 3. Thus, the compressor 13a is turned on and off.

The refrigerant discharged from the compressor 13a flows into the condenser 13b, and is condensed inside the condenser 13b. Then, the condensed refrigerant flows into the expansion valve 13c. The refrigerant that has flowed into the expansion valve 13c is decompressed, and then flows into the evaporator 13d. The evaporator 13d is disposed inside the air-conditioning casing 11, and the whole quantity of the air-conditioning air introduced into the air-conditioning casing 11 passes through the evaporator 13d. The refrigerant that has flowed into the evaporator 13d exchanges heat with the air-conditioning air passing through the outside of the evaporator 13d, while flowing through the inside of the evaporator 13d. Thus, the air-conditioning air is cooled, thereby producing cold air.

The heater core 14 is disposed downstream of the evaporator 13d in the airflow direction inside the air-conditioning casing 11. The heater core 14 is connected to a water jacket (not shown) of the engine E. A coolant in the engine E circulates through the heater core 14. Thus, if the coolant in the engine E has a higher temperature than the air-conditioning air passing through the outside of the heater core 14, the air-conditioning air is heated by exchanging heat with the coolant, thereby producing warm air.

Although not shown, in the case of an electric vehicle, for example, a coolant in a drive motor or an inverter can be passed through the heater core 14. Further, for example, in the case of an electric vehicle, the heater core 14 may be replaced with a heat pump system including an electric compressor 13a, and a refrigerant condenser (heating heat exchanger) may be provided inside the air-conditioning casing 11. In addition to the heater core 14, an electric heater (e.g., a PTC heater) or any other heater may be provided.

The air mixing damper 15 is a member for changing the ratio between the amount of air passing through the heater core 14 and the amount of air bypassing the heater core 14. As indicated by the solid line in FIG. 4, if the air mixing damper 15 fully closes a passage near the heater core 14, and fully opens a passage bypassing the heater core 14, air that has passed through the evaporator 13d does not pass through the heater core 14, and is thus in a full cold state. On the other hand, as indicated by the phantom line in FIG. 4, if the air mixing damper 15 fully opens the passage near the heater core 14, and fully closes the passage bypassing the heater core 14, the whole quantity of air that has passed through the evaporator 13d passes through the heater core 14, and is thus in a full hot state. The air mixing damper 15 can be stopped at an optional position between the position indicated by the solid line in FIG. 4 and the position indicated by the phantom line therein. Changing the position at which the air mixing damper 15 stops triggers a change in the ratio between the amount of air passing through the heater core 14 and the amount of air bypassing the heater core 14. As a result, the temperature of the produced air-conditioned wind is changed.

The air mix actuator 17 functions to actuate the air mixing damper 15, and is connected to the control unit 60 as shown in FIG. 3. The air mix actuator 17 can stop the air mixing damper 15 at a desired position upon receipt of a control signal from the control unit 60.

The blowing direction switching dampers 16a, 16b, and 16c shown in FIG. 4 are dampers for switching the direction in which air-conditioned wind blows out. One of the blowing direction switching dampers denoted by the reference character 16a is a damper for opening and closing the defroster outlet 102a, i.e., a defroster damper. Other ones of the blowing direction switching dampers denoted by the reference character 16b are dampers for opening and closing the vent outlets 102b, i.e., vent dampers. The other ones of the blowing direction switching dampers denoted by the reference character 16c are dampers for opening and closing the heat outlets 102c, i.e., heat dampers. The closed and open positions of each of the blowing direction switching dampers 16a, 16b, and 16c are indicated by the solid line and the phantom line, respectively. The blowing direction switching dampers 16a, 16b, and 16c can be stopped at an optional position between the closed position and the open position. Such motions of the blowing direction switching dampers 16a, 16b, and 16c can be achieved by a linkage (not shown) that has been known in the art.

The blowing direction switching dampers 16a, 16b, and 16c interlock with one another via the linkage to be capable of changing the direction in which air-conditioned wind blows out. For example, if the blowing direction switching damper 16a is in the open position, and the blowing direction switching dampers 16b and 16c are in the closed position, an operation is performed in a defroster mode in which air-conditioned wind blows out of only the defroster outlet 102a. If the blowing direction switching dampers 16b are in the open position, and the blowing direction switching dampers 16a and 16c are in the closed position, an operation is performed in a vent mode in which air-conditioned wind blows out of only the vent outlets 102b. If the blowing direction switching dampers 16c are in the open position, and the blowing direction switching dampers 16a and 16b are in the closed position, an operation is performed in a heat mode in which air-conditioned wind blows out of only the heat outlets 102c. If the blowing direction switching dampers 16a and 16c are in the open position, and the blowing direction switching dampers 16b are in the closed position, an operation is performed in a defrost/heat mode in which air-conditioned wind blows out of the defroster outlet 102a and the heat outlets 102c. If the blowing direction switching dampers 16b and 16c are in the open position, and the blowing direction switching damper 16a is in the closed position, an operation is performed in a bi-level mode in which air-conditioned wind blows out of the vent outlets 102b and the heat outlets 102c. The blowing modes described above are examples. Switching the blowing direction switching dampers 16a, 16b, and 16c between the open and closed positions allows switching to be made among the various modes, and triggers a change in the degree of opening of each of the defroster outlet 102a, the vent outlets 102b, and the heat outlets 102c. Thus, the volume of air-conditioned wind blowing out of each outlet can be changed.

The configurations of the blowing direction switching dampers 16a, 16b, and 16c are merely examples. For example, two dampers may also be combined together to switch the operation among the blowing modes.

The blowing direction switching actuator 18 functions to actuate the blowing direction switching dampers 16a, 16b, and 16c, and is connected to the control unit 60 as shown in FIG. 3. The blowing direction switching actuator 18 can stop the blowing direction switching dampers 16a, 16b, and 16c at respective desired positions upon receipt of a control signal from the control unit 60. Thus, an operation can be performed in any one of the blowing modes described above.

(Configuration of Seat Heater System 40)

Figure 5:
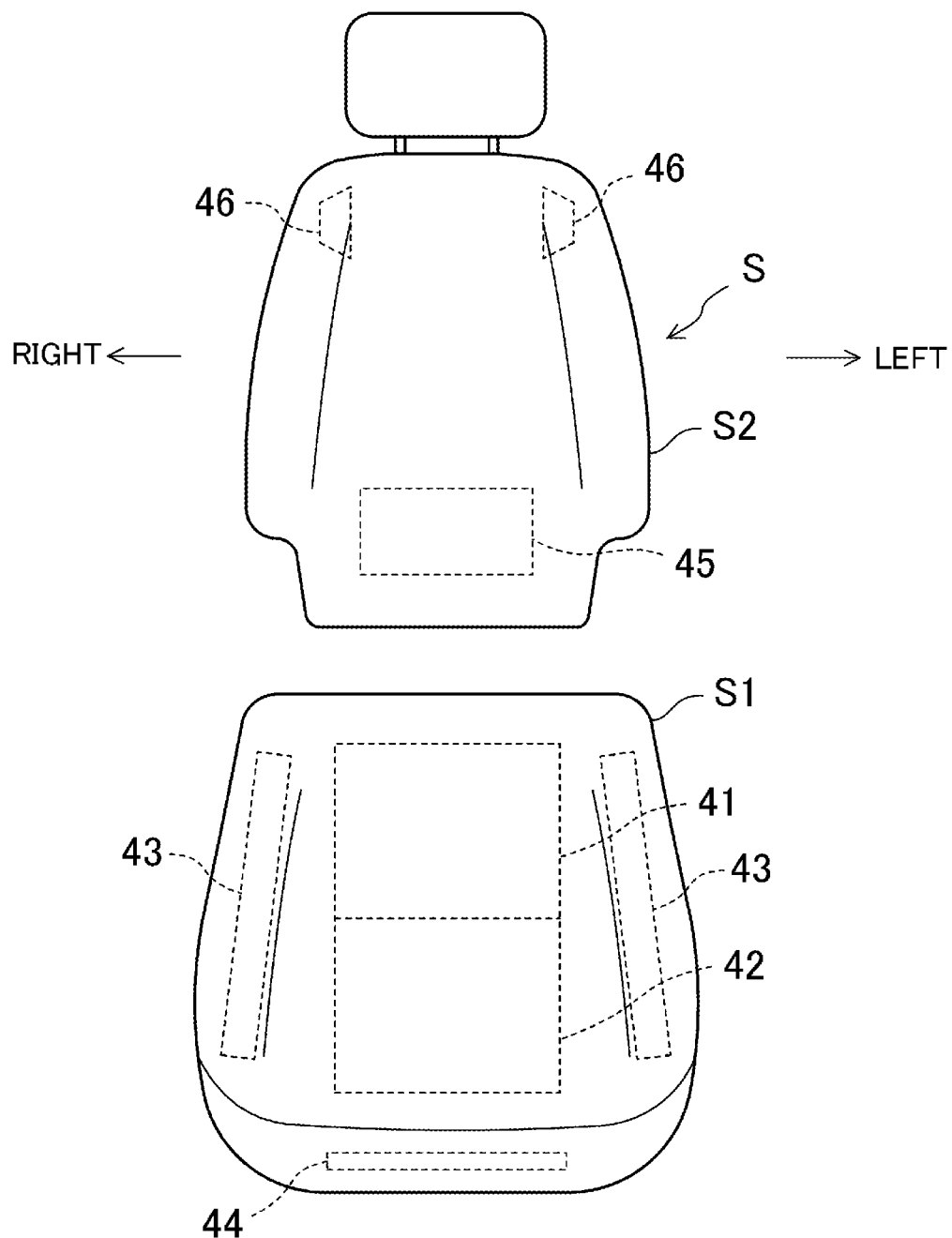
FIG. 5 illustrates a state in which a vehicle seat including a seat heater is divided into a seat cushion part and a seat back part.
Figure 6:
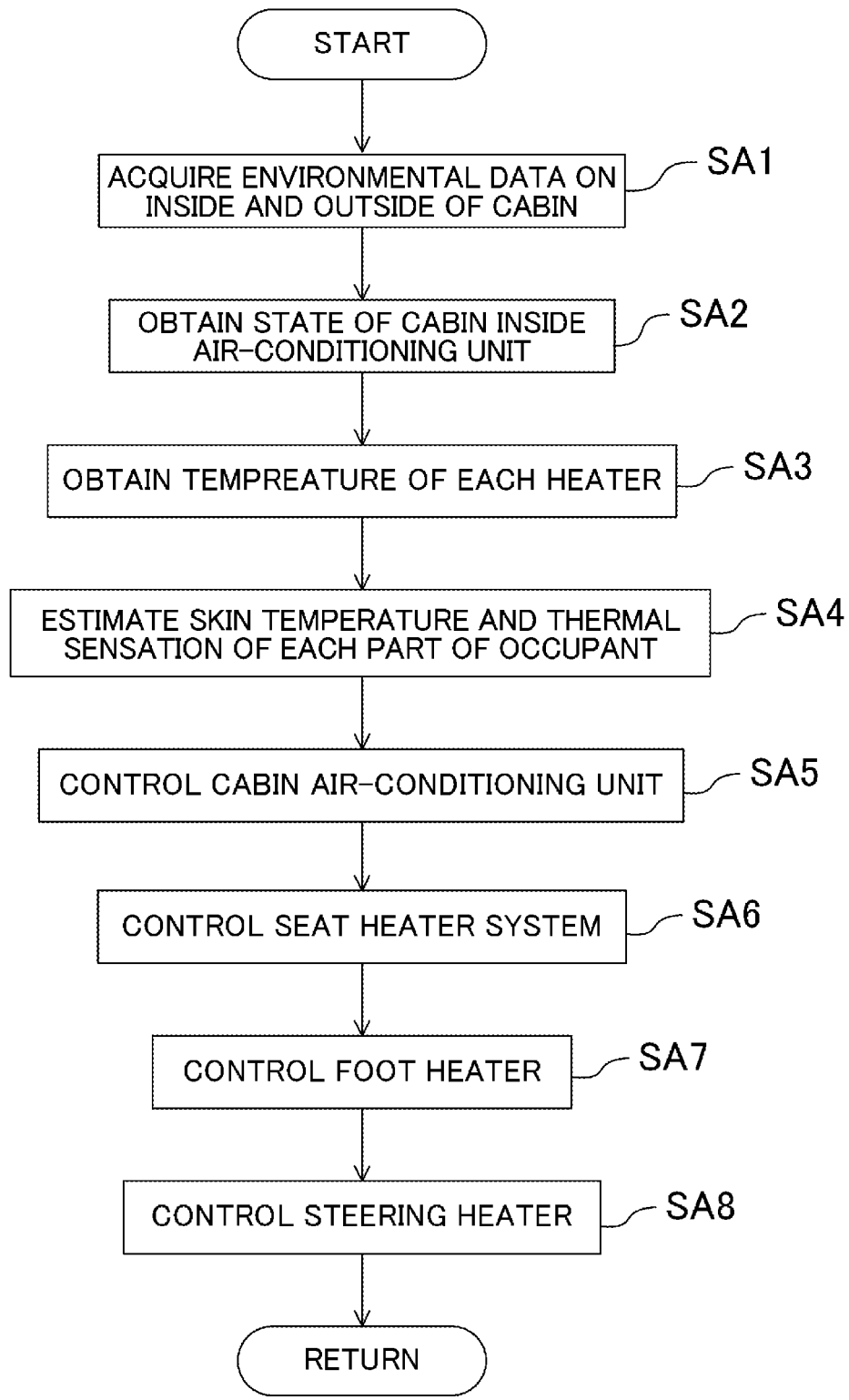
FIG. 6 is a flowchart illustrating control details for the vehicle heater.

As shown in FIG. 5, the seat heater system 40 is incorporated into the vehicle seat S. The vehicle seat S includes the seat cushion part S1, and the seat back part S2. FIG. 5 illustrates a state in which the vehicle seat S is divided into the seat cushion part S1 and the seat back part S2 for convenience of description. As shown in FIGS. 1 and 2, when the vehicle seat S is installed in the vehicle 1, the seat cushion part S1 and the seat back part S2 are integrated together. The vehicle seat S described in this embodiment constitutes a driver's seat. However, the present invention is applicable also to a seat constituting a seat next to the driver or a seat constituting a rear seat. The present invention is applicable also to a so-called bench seat on which a plurality of people can be seated side by side in the lateral direction.

The vehicle seat S includes the seat cushion part S1, and the seat back part S2. The seat cushion part S1 may be referred to also as a "seat bottom part", and is configured to mainly support, from below, a portion of the occupant A from his/her buttocks (bottom) to his/her thighs. The seat back part S2 may be referred to also as a "seat backrest part," and is configured to mainly support, from behind, the waist and back of the occupant A, portions of the occupant A around his/her shoulder blades, and his/her shoulders.

The seat heater system 40 includes a buttock heating element 41, a thigh heating element 42, cushion side portion heating elements 43, a cushion front end portion heating element 44, a waist heating element 45, and shoulder side heating elements 46. The buttock heating element 41, the thigh heating element 42, the cushion side portion heating elements 43, and the cushion front end portion heating element 44 are incorporated into the seat cushion part S1, and can be specifically disposed between a cushion material and an external skin material. The buttock heating element 41, the thigh heating element 42, the cushion side portion heating elements 43, and the cushion front end portion heating element 44 are connected to a cabin temperature control unit 64 of the control unit 60, and are controlled by the cabin temperature control unit 64.

The waist heating element 45 and the shoulder side heating elements 46 are incorporated into the seat back part S2, and can be specifically disposed between a cushion material and an external skin material. The waist heating element 45 and the shoulder side heating elements 46 are connected to the cabin temperature control unit 64 of the control unit 60, and are controlled by the cabin temperature control unit 64.

Each of the heating elements 41 to 46 is configured as, for example, a wire rod that generates Joule heat by energization. Specifically, each heating element according to this embodiment uses the phenomenon where current flowing through an object turns into heat energy to generate heat, and may be configured as, for example, a nichrome wire or any other suitable wire. The amount of heat generated by the wire rod increases or decreases depending not only on the magnitude of the current flowing through the wire rod, but also on the time during which the current flows therethrough.

The buttock heating element 41 is disposed in a back (rear) portion of an upper surface portion (seat portion) of the seat cushion part S1. The buttocks of the occupant A in the normal occupant posture are located immediately above the buttock heating element 41. The thigh heating element 42 is disposed in a near (front) portion of the upper surface portion (seat portion) of the seat cushion part S1. The thighs of the occupant A in the normal occupant posture are located immediately above the thigh heating element 42. The buttock heating element 41 and the thigh heating element 42 are positioned in the seat cushion part S1 to correspond to the respective parts of the occupant A in contact therewith. Thus, these heating elements serve as direct warmers configured to directly warm.

On the other hand, the cushion side portion heating elements 43 are respectively disposed near right and left ends of the upper surface portion of the seat cushion part S1. If the occupant A is an adult having an average height and an average weight, and the occupant A is in the normal occupant posture, the thighs of the occupant A may be located between the right and left cushion side portion heating elements 43, or may be mostly located outside an area immediately above the cushion side portion heating elements 43. Thus, regions of the vehicle seat S near right and left ends of the upper surface portion of the seat cushion part S1 are not in contact with the occupant A. These regions each include the cushion side portion heating element 43. Thus, the cushion side portion heating elements 43 are spaced apart from the occupant A, and are radiant warmers configured to warm the occupant A by radiant heat.

The cushion front end portion heating element 44 is disposed near an upper end portion of a front surface portion of the seat cushion part S1. The cushion front end portion heating element 44 is elongated in the lateral direction, and located to correspond to portions of the occupant A near the back of his/her right and left knees of the occupant A. If the occupant A is in the normal occupant posture, portions of the occupant A below his/her thighs (e.g., the back of his/her knees) are spaced upward or forward apart from the cushion front end portion heating element 44. A region of the vehicle seat S near the upper end portion of the front surface portion of the seat cushion part S1 is not in contact with the occupant A. This region includes the cushion front end portion heating element 44. The cushion front end portion heating element 44 is spaced apart from the occupant A, and is a radiant warmer configured to warm the occupant A by radiant heat.

The amount of heat generated by each of the buttock heating element 41, the thigh heating element 42, the cushion side portion heating elements 43, and the cushion front end portion heating element 44 can be changed through a change in the current value, energization period, or any other factor controlled by the cabin temperature control unit 64 of the control unit 60. The output upper limit value of each of the buttock heating element 41, the thigh heating element 42, the cushion side portion heating elements 43, and the cushion front end portion heating element 44 (the upper limit of the amount of heat generated per unit time) is set by the cabin temperature control unit 64. The cushion side portion heating elements 43 and the cushion front end portion heating element 44 each has an output upper limit value lower than those of the buttock heating element 41 and the thigh heating element 42.

The waist heating element 45 is disposed in a lower portion of the front surface portion of the seat back part S2. The waist of the occupant A in the normal occupant posture is located immediately in front of this waist heating element 45. The waist heating element 45 is positioned to correspond to a region of the seat back part S2 in contact with the occupant A. Thus, this heating element serves as a direct warmer configured to directly warm the occupant A. The waist heating element 45 may warm the back. In this case, this heating element functions as a waist-and-back heating element, and is a direct warmer.

The respective shoulder side heating elements 46 are disposed near the right and left ends of an upper portion of the front surface portion of the seat back part S2, and are positioned so as to be prevented from reaching the back of the occupant A. If the occupant A is an adult having an average height and an average weight, and the occupant A is in the normal occupant posture, the left shoulder side heating element 46 is lateral to his/her left shoulder, and the right shoulder side heating element 46 is lateral to his/her right shoulder. Regions of the vehicle seat S near the right and left ends of the upper portion of the front surface portion of the seat back part S2 are not in contact with the occupant A. These regions each include the shoulder side heating element 46. The shoulder side heating elements 46 are spaced apart from the occupant A, and are radiant warmers configured to warm the occupant A by radiant heat.

The amount of heat generated by each of the waist heating element 45 and the shoulder side heating elements 46 can be changed through a change in the current value, energization period, or any other factor controlled by the cabin temperature control unit 64 of the control unit 60. The output upper limit value of each of the waist heating element 45 and the shoulder side heating elements 46 is set by the cabin temperature control unit 64. The waist heating element 45 has an output upper limit value lower than the shoulder side heating elements 46.

The turning on or off of the seat heater system 40 and the setting of the degree of heating of the seat heater system 40 can be achieved through an operation switch (not shown) or any other suitable switch in the cabin R, and can also be automatically controlled by the cabin temperature control unit 64.

(Configuration of Steering Heater 104a)

As shown in FIGS. 1 and 2, the steering heaters 104a are incorporated into respective portions of the steering wheel 104 in contact with the hands of the occupant A, specifically, portions of the steering wheel 104 gripped by the occupant A who is driving. Thus, the steering heaters 104a are positioned to correspond to regions of the steering wheel 104 in contact with the occupant A, and each serve as a direct warming system configured to directly warm the occupant A.

The steering heaters 104a may be each configured as a wire rod similar to that of each of the heating elements of the seat heater system 40, and are connected to, and controlled by, the cabin temperature control unit 64 of the control unit 60. The turning on or off of the steering heaters 104a and the setting of the degree of heating of the steering heaters 104a can be achieved through an operation switch (not shown) or any other suitable switch in the cabin R, and can also be automatically controlled by the cabin temperature control unit 64.

(Configuration of Foot Heater 30)

As shown by the phantom lines in FIGS. 1 and 2, the respective foot heaters 30 are arranged in a portion facing the right calf of the occupant A and in a portion facing the left calf of the occupant A. Specifically, the foot heaters 30 can be arranged in an interior material such as a door trim or a console. The foot heaters 30 are spaced apart from the occupant A, and are radiant warmers configured to warm the occupant A by radiant heat.

The foot heaters 30 may be each configured as a wire rod similar to that of each of the heating elements of the seat heater system 40, and is connected to, and controlled by, the cabin temperature control unit 64 of the control unit 60. The turning on or off of the foot heaters 30 and the setting of the degree of heating of the foot heaters 30 can be achieved through an operation switch (not shown) or any other suitable switch in the cabin R, and can also be automatically controlled by the cabin temperature control unit 64.

(Configuration of Auxiliary Heater)

The buttock heating element 41, the thigh heating element 42, and the waist heating element 45 in the seat heater system 40, and the steering heater 104a configure a direct warmer. The cushion side portion heating elements 43, the cushion front end portion heating element 44, and the shoulder side heating elements 46 in the seat heater system 40, and the foot heaters 30 configure a radiation warmer. In this embodiment, the cabin air-conditioning unit 10 is a main heater, and the direct warmer and the radiant warmer are auxiliary heaters. The direct warmer can be, for example, a heater or the like incorporated in an armrest. The radiant warmer can be, for example, a heater incorporated in the lower surface of a steering column. Both the direct warmer and the radiant warmer can be provided, but only one of them may be provided.

The direct warmer may include any one of or two or more of the buttock heating element 41, the thigh heating element 42, the waist heating element 45, and the steering heaters 104a. The radiant warmer may include any one of or two or more of the cushion side portion heating elements 43, the cushion front end portion heating element 44, the shoulder side heating elements 46, and the foot heaters 30.

(Other Configurations of Vehicle Heater 2)

As shown in FIG. 3, the vehicle heater 2 includes an airflow rate sensor 70, an outside air temperature sensor 71, an inside air temperature sensor 72, a humidity sensor 73, a solar radiation sensor 74, a temperature setting switch 75, a steering temperature sensor 76, foot heater temperature sensors 77, and a seat temperature sensor 78. These sensors and the switch may be configured as members that have been known in the art, and are connected to the control unit 60 to output their sensed values in predetermined short cycles or successively, for example. The sensors that detect a temperature may include a thermocouple, for example.

The airflow rate sensor 70 is disposed inside the cabin R, detects the airflow rate near the occupant A inside the cabin R, and can sense or estimate the airflow condition inside the cabin. The outside air temperature sensor 71 is disposed outside the cabin, and detects the air temperature outside the cabin. The inside air temperature sensor 72 is disposed inside the cabin R, detects the air temperature inside the cabin R, and can sense or estimate the temperature condition inside the cabin. The humidity sensor 73 is disposed inside the cabin R, detects the humidity inside the cabin R, and can sense or estimate the humidity condition inside the cabin.

The solar radiation sensor 74 is disposed inside the cabin R, detects the amount of solar radiation entering the cabin R, and can sense or estimate the solar radiation condition inside the cabin R. The temperature setting switch 75 is disposed on the instrument panel 102 in the cabin R, and is used by the occupant A to set a desired conditioned air temperature.

The cabin condition includes the airflow condition, the temperature condition, the humidity condition, and the solar radiation condition, inside the cabin R. Among these four conditions, any one of them may be only sensed or estimated. Specifically, the cabin condition detector according to the present invention includes the airflow rate sensor 70, the inside air temperature sensor 72, the humidity sensor 73, and a solar radiation sensor 74, but at least one of them may be provided.

The instrument panel 102 includes, not only the temperature setting switch 75, but also an on/off switch for air conditioning, an air volume adjusting switch, and an automatic air-conditioning switch, although not shown.

The steering temperature sensor 76 is disposed on the steering wheel 104, and detects the temperature of portions of the steering wheel 104 in contact with the occupant A, the temperature of the steering heaters 104a, and other temperatures. The foot heater temperature sensors 77 are disposed on the respective interior materials including the foot heaters 30, and detect the surface temperatures of the interior materials, the temperatures of the foot heaters 30, and other temperatures. The respective seat temperature sensors 78 are incorporated into the seat cushion part S1 and the seat back part S2 of the vehicle seat S, and detect the temperatures of the external skin materials of the seat cushion part S1 and the seat back part S2 and the temperatures of the heating elements 41 to 46 of the seat heater system 40.

In this embodiment, the vehicle heater 2 includes a skin temperature sensor 79, but this skin temperature sensor 79 is not an essential component and may be omitted. When a skin temperature sensor 79 is provided, an infrared ray sensor that has been known in the art can be used as the skin temperature sensor 79. By arranging the skin temperature sensor 79, for example, on a ceiling part and the like and orienting the direction of detection to the direction toward the occupant A, the intensity of infrared ray from each part of the occupant A can be detected, the skin temperature of the occupant A (the surface temperature of the occupant A) can be obtained based on the intensity of the infrared ray. To detect the intensity of infrared ray of a wide range, the skin temperature sensor 79 may be an infrared sensor capable of moving upward, downward, leftward, and rightward (scanning type), or include a plurality of infrared sensors. With the infrared sensor, an image based on the intensity of infrared ray can be obtained. By subjecting this image based on the intensity of infrared ray to image processing, not only it is possible to detect the surface temperature of each part of the occupant A, but also the position of each part of the occupant A and the physique of the occupant A can be estimated.

(Configuration of Control Unit 60)

Although not shown, the control unit 60 shown in FIG. 3 may be configured as, for example, a microcomputer including a central processing unit and a storage device (e.g., a ROM or a RAM) and may implement the later-described means and processes in the form of hardware or in the form of software (a program) stored in the storage device.

The control unit 60 includes an operation state detection unit 61, a target thermal sensation setting unit 62, an occupant thermal sensation estimation unit 63, a cabin temperature control unit 64, and a heating energy consumption detection unit 65.

(Configuration of Operation State Detection Unit 61)

The operation state detection unit 61 is configured to detect the operation states of the cabin air-conditioning unit 10 and the auxiliary heater. The operation state of the cabin air-conditioning unit 10 includes, for example, on and off states and rotation rate of the blower motor 12b, an operation state of the air mix actuator 17, an operation state of the blowing direction switching actuator 18, an operation state of the refrigeration-cycle system 13, and the like. The rotation rate of the blower motor 12b can be detected by a voltage applied to the blower motor 12b or the like.

The operation state of the air mix actuator 17 means where the air mix actuator 17 positions the air mixing damper 15. By detecting the operation state of the air mix actuator 17, the current position of the air mixing damper 15 can be obtained. The position of the air mixing damper 15 can be expressed by an opening degree, that is, the opening degree of 100% may be the full hot state, and the opening degree of 0% may be a full cold state, or vice versa. The temperature of the generated air-conditioned wind can be estimated by experiment or the like.

The operation state of the blowing direction switching actuator 18 means which of the blowing modes the blowing direction switching actuator 18 has made the blowing direction switching dampers 16a, 16b, and 16c be in. By detecting the operation state of the blowing direction switching actuator 18, the current blowing mode can be obtained.

The operation state of the auxiliary heater means on and off states and the degree of heating of the buttock heating element 41, thigh heating element 42, cushion side portion heating elements 43, cushion front end portion heating element 44, waist heating element 45, and shoulder side heating elements 46 in the seat heater system 40, the on and off states and the degree of heating of the steering heaters 104a, and on and off states and the degree of heating of the foot heaters 30. The operation state of the auxiliary heater also includes values detected by the steering temperature sensor 76, the foot heater temperature sensors 77, and the seat temperature sensors 78.

(Configuration of Target Thermal Sensation Setting Unit 62)

The target thermal sensation setting unit 62 is configured to set thermal sensations of the respective parts of an occupant A. As shown in FIG. 2, the occupant A is virtually divided into a finite number of parts A1 to A16. The part A1 indicates the neck and head. The part A2 indicates a region from the chest to abdomen, and the part A3 indicates a region from the both sides to the back and the waist. The part A4 indicates a region from the hypogastrium to left and right thighs through the crotch. The part A5 indicates a region from the right shoulder to the right brachium, and the part A6 indicates a region from the left shoulder to the left brachium. The part A7 indicates a region from the vicinity of the right elbow to the right wrist, and the part A8 indicates a region from the left elbow to the left wrist. The part A9 indicates the right hand, and the part A10 indicates the left hand. The part A11 indicates a region from the right thigh to the right knee, and the part A12 indicates a region from the left thigh to the left knee. The part A13 indicates a region from the right shin to the right calf, and the part A14 indicates a region from the left shin to the left calf. The part A15 indicates a region from the right ankle to the right toe, and the part A16 indicates a region from the left ankle to the left toe. When the occupant A is virtually divided into parts, the number of the parts may be arbitrarily set, and the dividing boundary lines may be arbitrarily set.

The parts A1, A3, A5 and A6 are more distal parts from the vent outlets 102b (shown in FIG. 1) than the parts A7 and A8. Further, the parts A15 and A16 are nearer parts to the heat outlets 102c than the parts A11 and A12. Specifically, the parts A1 to A16 of the occupant A include near parts to the outlets 102b and 102 and distal parts from the outlets 102b and 102c in the cabin air-conditioning unit 10.

The target thermal sensations of the respective parts of the occupant A may be set by, for example, the temperature set by the occupant A, the inside air temperature, the outside air temperature, the amount of solar radiation, and the airflow in the cabin R. The thermal sensation herein means feeling of hotness, coldness, and the like, which is a commonly used expression among people with ordinary skill in the art, as is elaborated, for example, on pages 33, 88 to 94 of "Car Air Conditioner" supervised by Kenichi Fujiwara, issued by Tokyo Denki University Press, on Sep. 20, 2009. The skin temperature is an example that correlates with the thermal sensation. For example, there is an established technique of detecting a surface temperature of a thermal mannequin as the skin temperature, and based on this, evaluating the thermal sensation of the occupant A by giving 3 for "Hot", 2 for "warm", 1 for "slightly warm", 0 for "neutral (just about right)", −1 for "slightly cool", −2 for "cool", and −3 for "cold". The "high thermal sensation" means that the above numerical value is high and is on the hot side, whereas the "low thermal sensation" means that the above numerical value is low and is on the cold side. The target thermal sensations set by the target thermal sensation setting unit 62 has a certain range. For example, the range can be expressed by the above-described numerical values, and can be expressed by a range of 2 to 0, for example. The thermal sensation may also be expressed in nine levels of, for example, 1 to 9, from hot to cold. In this case, 5 indicates "just about right", 1 indicates "cold", and 9 indicates "hot." The system of the expression is not particularly limited.

The target thermal sensation setting unit 62 sets target thermal sensations in accordance with the temperature set by the occupant A so that the occupant feels just about right. Further, the target thermal sensations of the respective parts of the occupant A are individually set. The occupant can set the target thermal sensations according to his/her preference, and can set, for example, the target thermal sensation of the feet to be higher.

(Configuration of Occupant Thermal Sensation Estimation Unit 63)

The occupant thermal sensation estimation unit 63 is configured to quantitatively estimate thermal sensations of the respective parts A1 to A16 of the occupant A based on the cabin conditions sensed or estimated by the airflow rate sensor 70, the inside air temperature sensor 72, the humidity sensor 73, and the solar radiation sensor 74, and the operation states of the cabin air-conditioning unit 10 and the auxiliary heater detected by the operation state detection unit 61.

For example, if the airflow rate sensor 70 senses a low airflow rate, and the cabin air-conditioning unit 10 is performing heating operation, it is estimated that the state in the cabin R is the steady state. Thus, it can further be estimated that the thermal sensations of the respective parts A1 to A16 of the occupant A are neither high nor low. On the other hand, if the airflow rate sensor 70 senses a high airflow rate, and the cabin air-conditioning unit 10 is performing heating operation, it is estimated that the state in the cabin R is not warm yet. Thus, it can further be estimated that the thermal sensations of the respective parts A1 to A16 of the occupant A are low. In this case, when the steering heaters 104a are on, it can be estimated that the thermal sensations of the hands (A9, A10 in FIG. 2) are high, and when the foot heaters 30 are on, it can be estimated that the thermal sensations of the shins and calves (A13, A14 in FIG. 2) are high.

The occupant thermal sensation estimation unit 63 cam estimate thermal sensations of the respective parts A1 to A16 based on the estimated values of the skin temperatures of the respective parts A1 to A16 of the occupant A. The skin temperatures of the occupant A can be estimated by the skin temperature estimation unit 66 in the control unit 60.

A calculation model for quantitative estimation of the skin temperatures may have been known in the art. For example, the calculation model may be the human thermoregulation model described in "Development of JOS-2 human thermoregulation model with detailed vascular system, Yutaka Kobayashi, Shin-ichi Tanabe, Building and Environment 66, 2013, pp 1-10."

Note that, although not essential, in the case in which the skin temperature sensor 79 is provided, the skin temperatures of the occupant A may be estimated based on the detection results of the skin temperature sensor 79. Thus, the estimated values of the skin temperatures may be obtained. The skin temperature sensor 79 may detect over a wide area as mentioned above. Thus, the skin temperatures of not only the head, but also the arms and the hands can be estimated.

The occupant thermal sensation estimation unit 63 may quantitatively estimate thermal sensations of the respective parts A1 to A16 of the occupant A based on the cabin conditions and the operation states of the cabin air-conditioning unit 10 and the auxiliary heater, and estimate thermal sensations of the respective parts A1 to A16 based on the estimated values of the skin temperatures estimated by the skin temperature estimation unit 66, in parallel or alternately. This allows reliable estimation results to be reflected in the control.

A thermal sensation calculation model for quantitative estimation of the thermal sensations may have been known in the art. For example, the calculation model may be the thermal sensation calculation model described in "Thermal sensation and comfort models for non-uniform and transient environments: Part I: Local sensation of individual body parts, Hui Zhang et. al., building and Environment 45, 2010, pp 380-388" or "Thermal sensation and comfort models for non-uniform and transient environments, part III: Whole-body sensation and comfort, Hui Zhang et. al., Building and Environment 45 (2010) 399-410."

The model for calculating whether the occupant A feels comfortable may be a comfortable sensation calculation model described in "Thermal sensation and comfort models for non-uniform and transient environments, part II: Local comfort of individual body parts Hui Zhang et. al., Building and Environment 45 (2010) 389-398."

(Configuration of Cabin Temperature Control Unit 64)

The cabin temperature control unit 64 is configured to individually control the cabin air-conditioning unit 10 and the auxiliary heater so that the thermal sensations of the respective parts A1 to A16 of the occupant A estimated by the occupant thermal sensation estimation unit 63 fall within the range set by the target thermal sensation setting unit 62. Control details will be described later.

(Configuration of Heating Energy Consumption Detection Unit 65)

The heating energy consumption detection unit 65 is configured to detect heating energy consumptions of the cabin air-conditioning unit 10 and the auxiliary heater. The heating energy consumption of the cabin air-conditioning unit 10 can be detected as the operation state of the compressor 13a of the cabin air-conditioning unit 10, and if the cabin air-conditioning unit 10 is equipped with a PTC heater, the heating energy consumption of the cabin air-conditioning unit 10 can be detected based on the amount of electricity supplied to the PTC heater. The heating energy consumption of the auxiliary heater can be detected as a sum of the amounts of electricity supplied to the buttock heating element 41, thigh heating element 42, cushion side portion heating elements 43, cushion front end portion heating element 44, waist heating element 45, and shoulder side heating elements 46 in the seat heater system 40, the amounts of electricity supplied to the steering heaters 104a, and the amounts of electricity supplied to the foot heaters 30.

(Control Details for Cabin Temperature Control Unit 64)

Next, the control details for the cabin temperature control unit 64 will be described based on the flowcharts shown in FIGS. 6 to 10. In step SA1 of the flowchart shown in FIG. 6, environmental data on the inside and outside of the cabin are acquired. The environmental data on the inside and outside of the cabin can be acquired from values detected by the airflow rate sensor 70, the outside air temperature sensor 71, the inside air temperature sensor 72, humidity sensor 73, the solar radiation sensor 74, and the skin temperature sensor 79 and the state of the operation switches (such as the temperature setting switch 75).

Then, in step SA2, the operation state of the cabin air-conditioning unit 10 is obtained. This operation state can be obtained from the operation state detection unit 61. In step SA3, the temperatures of the heating elements 41 to 46 of the seat heater system 40, the temperature of the steering heaters 104a, and the temperatures of the foot heaters 30 are obtained based on the values detected by the steering temperature sensor 76, the foot heater temperature sensors 77, and the seat temperature sensors 78. The order of steps SA1 to SA3 is not limited, and steps SA1 to SA3 may be performed in parallel.

In step SA4, the skin temperature estimation unit 66 estimates the skin temperatures of the respective parts A1 to A16 of the occupant A, and thermal sensations of the respective parts A1 to A16 are also estimated. If the skin temperature sensor 79 is provided, the skin temperatures may be estimated based on the values detected by the skin temperature sensor 79. The thermal sensations may be estimated by the occupant thermal sensation estimation unit 63.

After step SA4, the flow proceeds to step SA5 to control the cabin air-conditioning unit 10. Thereafter, the flow proceeds to step SA6 to control the seat heater system 40. Subsequently, in step SA7, the foot heaters 30 are controlled, and in step SA8, the steering heaters 104a are controlled. The order of steps SA6 to SA8 is not limited, and steps SA6 to SA8 may be performed in parallel.

Figure 7:
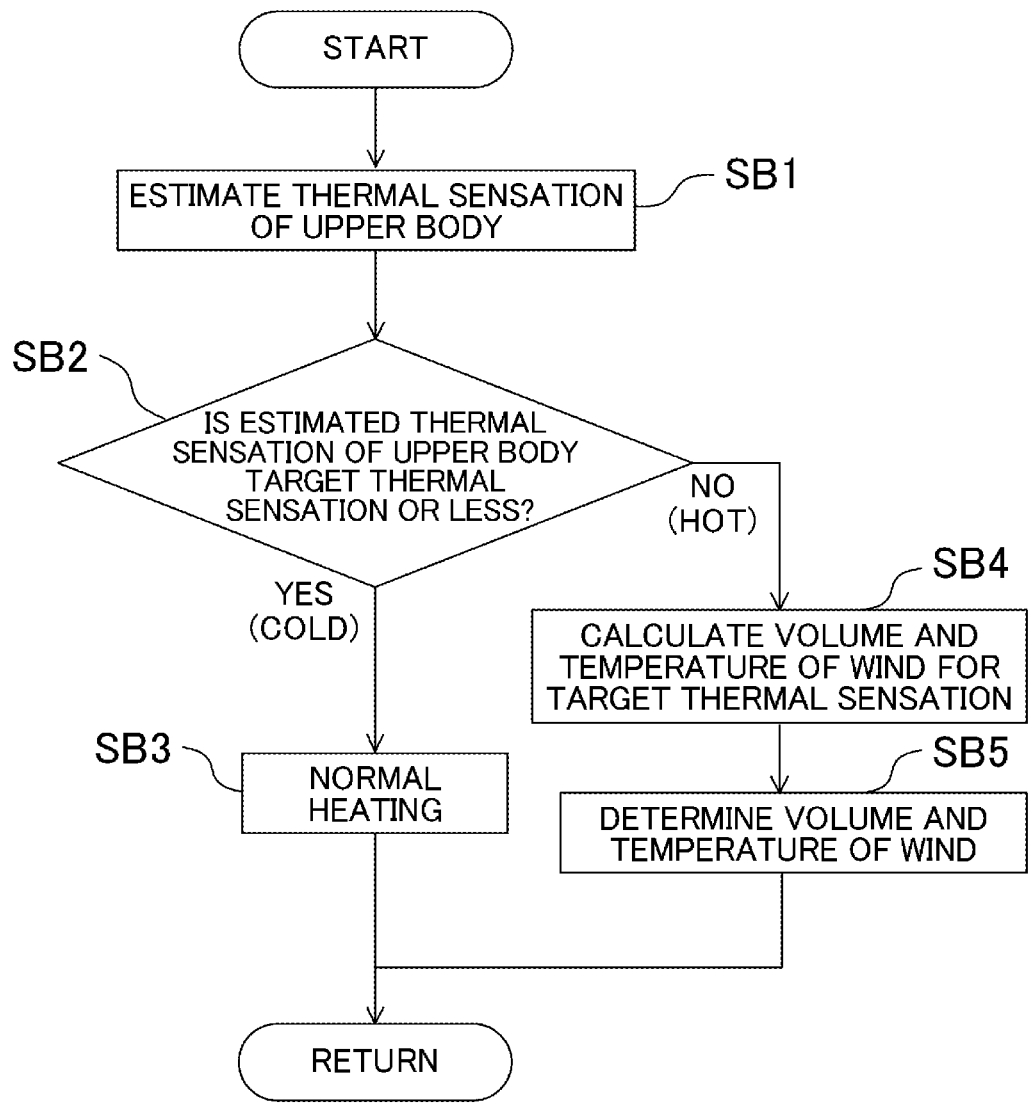
FIG. 7 is a flowchart illustrating control details for the cabin air-conditioning unit.
Figure 8:
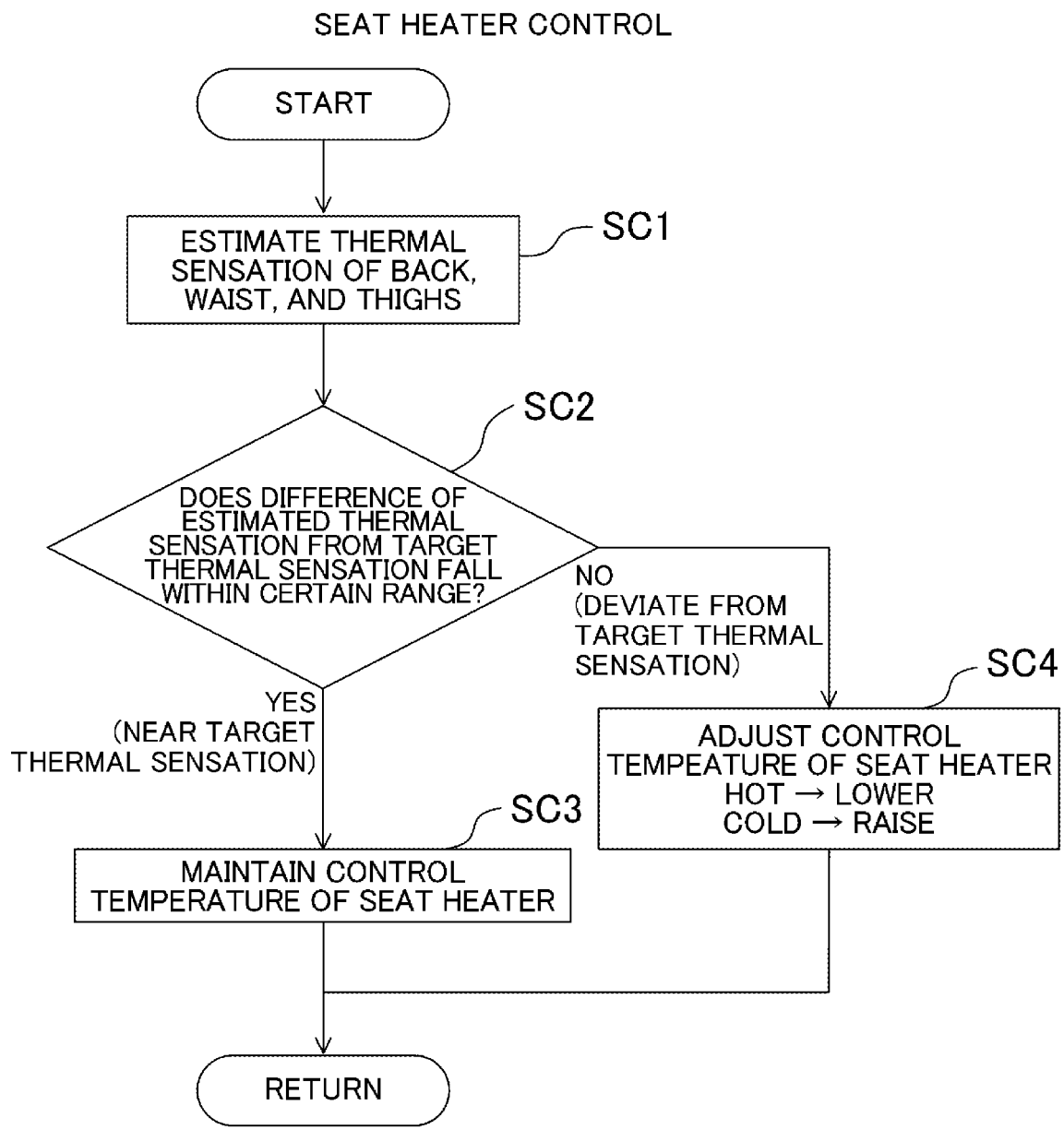
FIG. 8 is a flowchart illustrating control details for the seat heater.

The control details for the cabin air-conditioning unit 10 in step SA5 will be described with reference to the flowchart shown in FIG. 7. For the control of the cabin air-conditioning unit 10, in step SB1, thermal sensations of the upper body of the occupant A are estimated. The upper body includes the parts A1 to A3 and A5 to A8 shown in FIG. 2. These thermal sensations may be estimated based on the thermal sensations obtained by the occupant thermal sensation estimation unit 63. Further, although not indicated in the step, the target thermal sensations of the respective parts of the occupant A set by the target thermal sensation setting unit 62 are obtained.

In step SB2, it is determined whether or not the thermal sensations of the upper body of the occupant A estimated in step SB1 are equal to or lower than the respective target thermal sensations of the upper body of the occupant A. If the thermal sensations of the upper body of the occupant A are equal to or lower than the respective target thermal sensations and the determination is YES in step SB2, i.e., the occupant A feels cold, the flow proceeds to step SB3 to perform normal heating by the cabin air-conditioning unit 10. The normal heating is automatic air conditioning control performed based on the values detected by the outside air temperature sensor 71, the inside air temperature sensor 72, the humidity sensor 73, the solar radiation sensor 74, and the temperature setting switch 75, and the temperature set by the occupant A. Since this automatic air conditioning control is a technique that has been known in the art, the detailed description thereof is omitted.

If the thermal sensations of the upper body of the occupant A are higher than the respective target thermal sensations and the determination is NO in step SB2, i.e., the occupant A feels hot, the flow proceeds to step SB4. In step SB4, the volume of air delivered by the blower 12 of the cabin air-conditioning unit 10 is calculated so that the thermal sensations of the upper body of the occupant A fall within the range of the target thermal sensations, and the temperature of the air-conditioned wind, i.e., the degree of opening of the air mixing damper 15 is calculated. Specifically, since the occupant A feels hot, the volume of air delivered by the blower 12 is lowered, and the air mixing damper 15 is actuated in a direction in which the volume of air passing through the heater core 14 is lowered. Only one of the calculation of the volume of air delivered by the blower 12 or the calculation of the degree of opening of the air mixing damper 15 may be performed, or both of them may be performed. Thereafter, in step SB5, the volume of air and the degree of opening of the air mixing damper 15 calculated in step SB4 are determined, and the blower 12 and the blowing direction switching actuator 18 are controlled.

Figure 11:
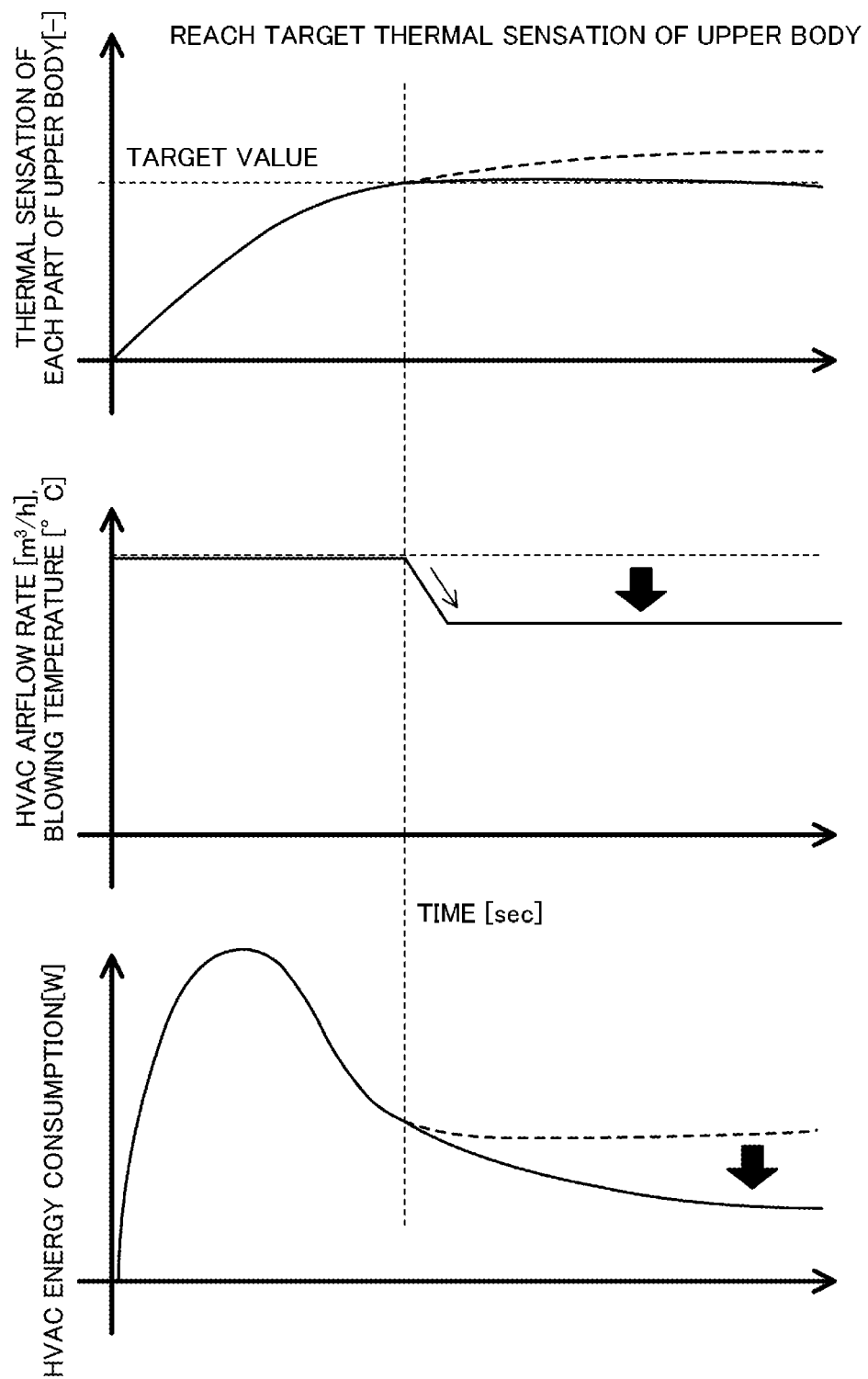
FIG. 11 is a graph illustrating control details for the cabin air-conditioning unit.

As shown in the bottom graph of FIG. 11, during heating operation, the HVAC energy consumption (the heating energy consumption of the cabin air-conditioning unit 10) increases until the thermal sensations of the upper body of the occupant A reach the respective target thermal sensations, and when the thermal sensations of the upper body of the occupant A approaches the respective target thermal sensations, the HVAC energy consumption decreases. When the thermal sensations of the upper body of the occupant A reaches the respective target thermal sensations, as shown in the center graph of FIG. 11, the volume of air delivered by the blower 12 as well as the temperature of the air-conditioned wind are lowered, so that the HVAC energy consumption decreases as indicated by the broken line in the bottom graph in FIG. 11.

Although the HVAC energy consumption decreases, as shown in the top graph of FIG. 11, the volume of air delivered by the blower 12 and the temperature of the air-conditioned wind are set so that the thermal sensations of the upper body of the occupant A falls within the range of the target thermal sensations, and thus the occupant A does not feel uncomfortable.

Next, the control details for the seat heater system 40 will be described with reference to the flowchart shown in FIG.

8. In step SC1, the thermal sensations of the back, the waist, and the thighs of the occupant A are estimated. The back, the waist, and the thighs are indicated by the parts A3, A4, A11, and A12 shown in FIG. 2. These thermal sensations may be estimated based on the thermal sensations obtained by the occupant thermal sensation estimation unit 63. Further, although not indicated in the step, the target thermal sensations of the respective parts of the occupant A set by the target thermal sensation setting unit 62 are obtained.

In step SC2, it is determined whether or not the differences between the thermal sensations of the back, the waist, and the thighs of the occupant A estimated in step SC1 and the target thermal sensations of the back, the waist, and the thighs of the occupant A fall within a certain range. The differences within a certain range may be defined as, for example, about 1 as a numerical expression of the thermal sensations. If the estimated thermal sensations of the back, the waist, and the thighs of the occupant A are near the respective target thermal sensations, and the determination is YES in step SC2, i.e., the occupant A feels neither hot nor cold, the flow proceeds to step SC3 to maintain the current temperatures of the respective heating elements 41 to 46 of the seat heater system 40.

If the estimated thermal sensations of the back, the waist, and the thighs of the occupant A deviate from the target thermal sensations and the determination is NO in step SC2, the flow proceeds to step SC4. Deviating may be defined as a difference of 2 or more as a numerical expression of the thermal sensation, the difference is a difference between the estimated thermal sensation and the target thermal sensation. In step SC4, the temperature of the seat heater system 40 is adjusted. If the result of the determination in step SC2 estimates that the occupant A feels hot at the back, the waist, and the thighs, the temperature set for the seat heater system 40 is lowered. If the results estimates that the occupant A feels cold at the back, the waist, and the thighs, the temperature set for the seat heater system 40 is raised.

Figure 12:
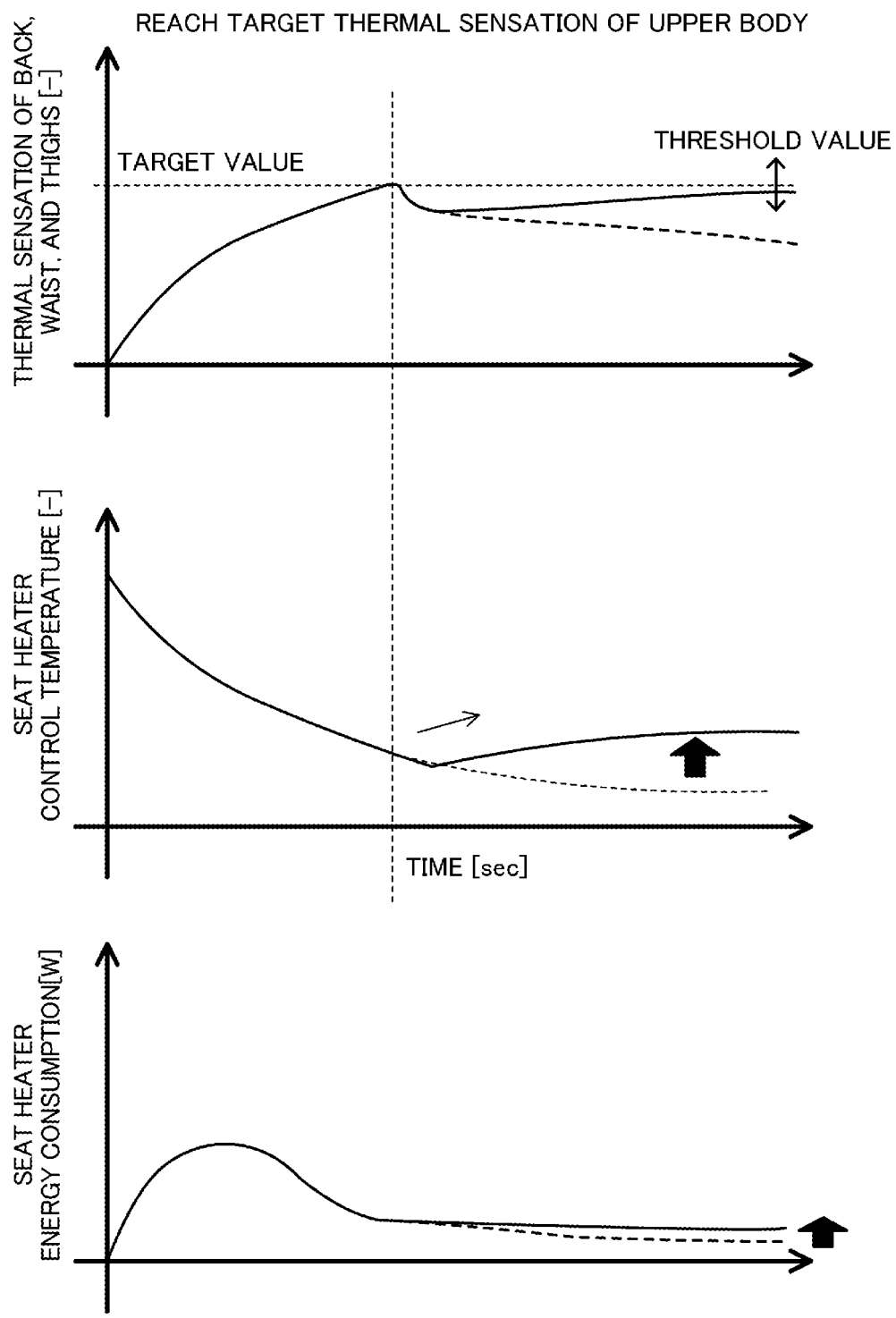
FIG. 12 is a graph illustrating control details for the seat heater.

As shown in the bottom graph of FIG. 12, while the seat heater system 40 is on, the consumption (the heating energy consumption of the auxiliary heater) increases until the thermal sensations of the back, the waist, and the thighs of the occupant A reach the respective target thermal sensations, and when the thermal sensations of the back, the waist, and the thighs of the occupant A approaches the respective target thermal sensations, the consumption decreases. When the thermal sensations of the back, the waist, and the thighs of the occupant A reach the respective target thermal sensations, the temperature set for the seat heater system 40 is raised as shown in the middle graph of FIG. 12. This temperature raising control for the seat heater system 40 is performed after the decrease in consumption shown in FIG. 12.

Specifically, the decrease in consumption shown in FIG. 12 means the decrease in heat input by the cabin air-conditioning unit 10, and by the decrease, the thermal sensations of the back, the waist, and the thighs of the occupant A decrease (the occupant A feels cold). Thus, by the temperature raising control for the seat heater system 40, the decrease in heat input by the cabin air-conditioning unit 10 can be compensated. This allows the occupant A to be avoided from feeling uncomfortable.

Further, if it is estimated that the occupant A feels hot at the back, the waist, and the thighs, the temperature set for the seat heater system 40 is lowered. Thus, the occupant A does not feel uncomfortable.

Figure 9:
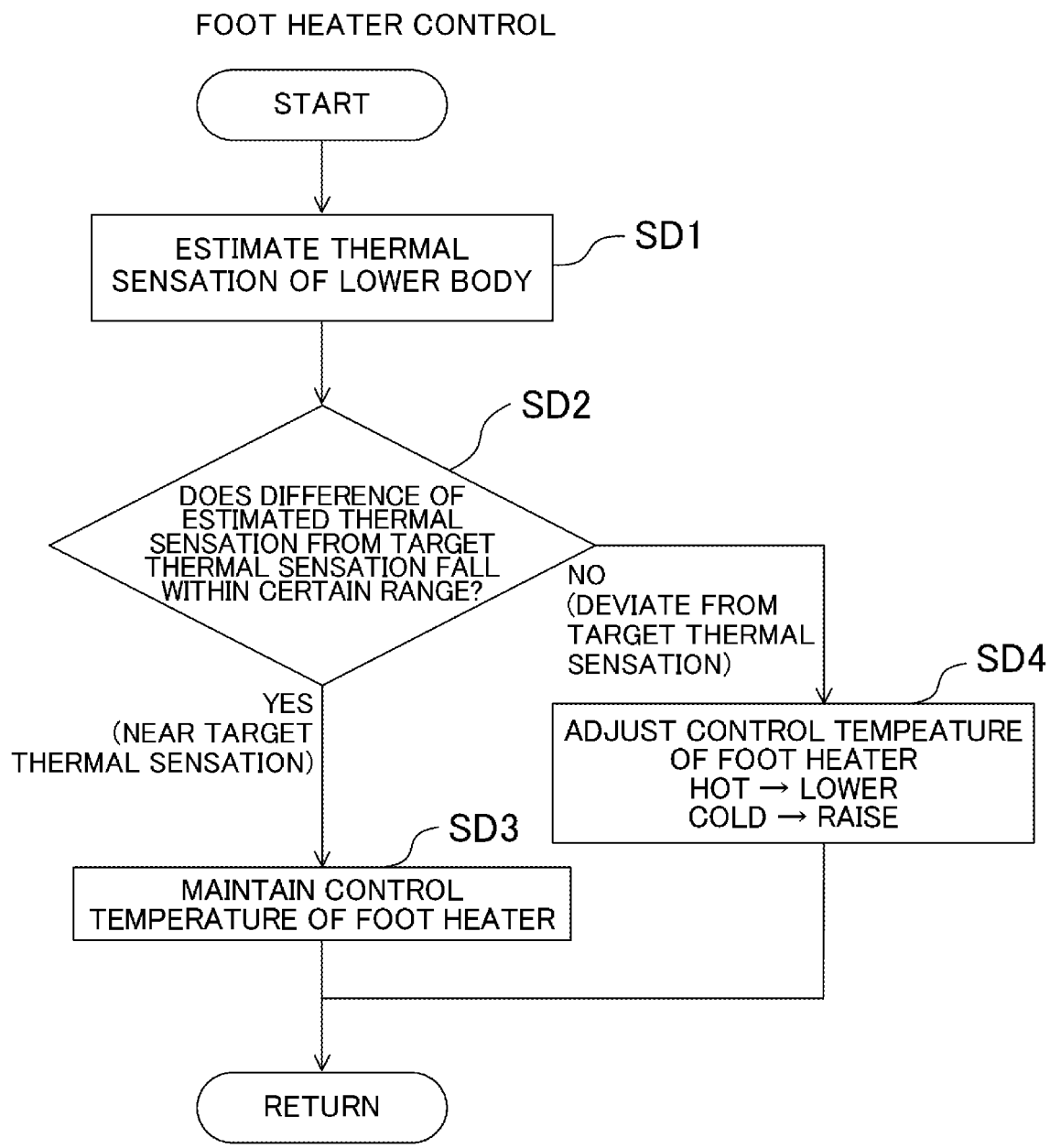
FIG. 9 is a flowchart illustrating control details for a foot heater.

Next, the control details for the foot heaters 30 will be described with reference to the flowchart shown in FIG. 9.

In step SD1, the thermal sensations of the lower body of the occupant A are estimated. The lower body of the occupant A includes the parts A4 and A11 to A16 shown in FIG. 2. These thermal sensations may be estimated based on the thermal sensations obtained by the occupant thermal sensation estimation unit 63. Further, although not indicated in the step, the target thermal sensations of the respective parts of the occupant A set by the target thermal sensation setting unit 62 are obtained.

In step SD2, it is determined whether or not the differences between the thermal sensations of the lower body of the occupant A estimated in step SD1 and the target thermal sensations of the lower body of the occupant A fall within a certain range. The differences within a certain range may be defined as, for example, about 1 as a numerical expression of the thermal sensations. If the estimated thermal sensations of the lower body of the occupant A are near the respective target thermal sensations and the determination is YES in step SD2, i.e., the occupant A feels neither hot nor cold, the flow proceeds to step SD3 to maintain the current temperatures of the respective foot heaters 30.

If the estimated thermal sensations of the lower body of the occupant A deviate from the target thermal sensations and the determination is NO in step SD2, the flow proceeds to step SD4. Deviating may be defined as a difference of 2 or more as a numerical expression of the thermal sensation, the difference is a difference between the estimated thermal sensation and the target thermal sensation. In step SD4, the temperatures of the foot heaters 30 are adjusted. If the result of the determination in step SD2 estimates that the occupant A feels hot at the lower body, the temperature of the foot heaters 30 are lowered. If the result estimates that the occupant A feels cold at the lower body, the temperatures of the foot heaters 30 are raised.

Figure 13:
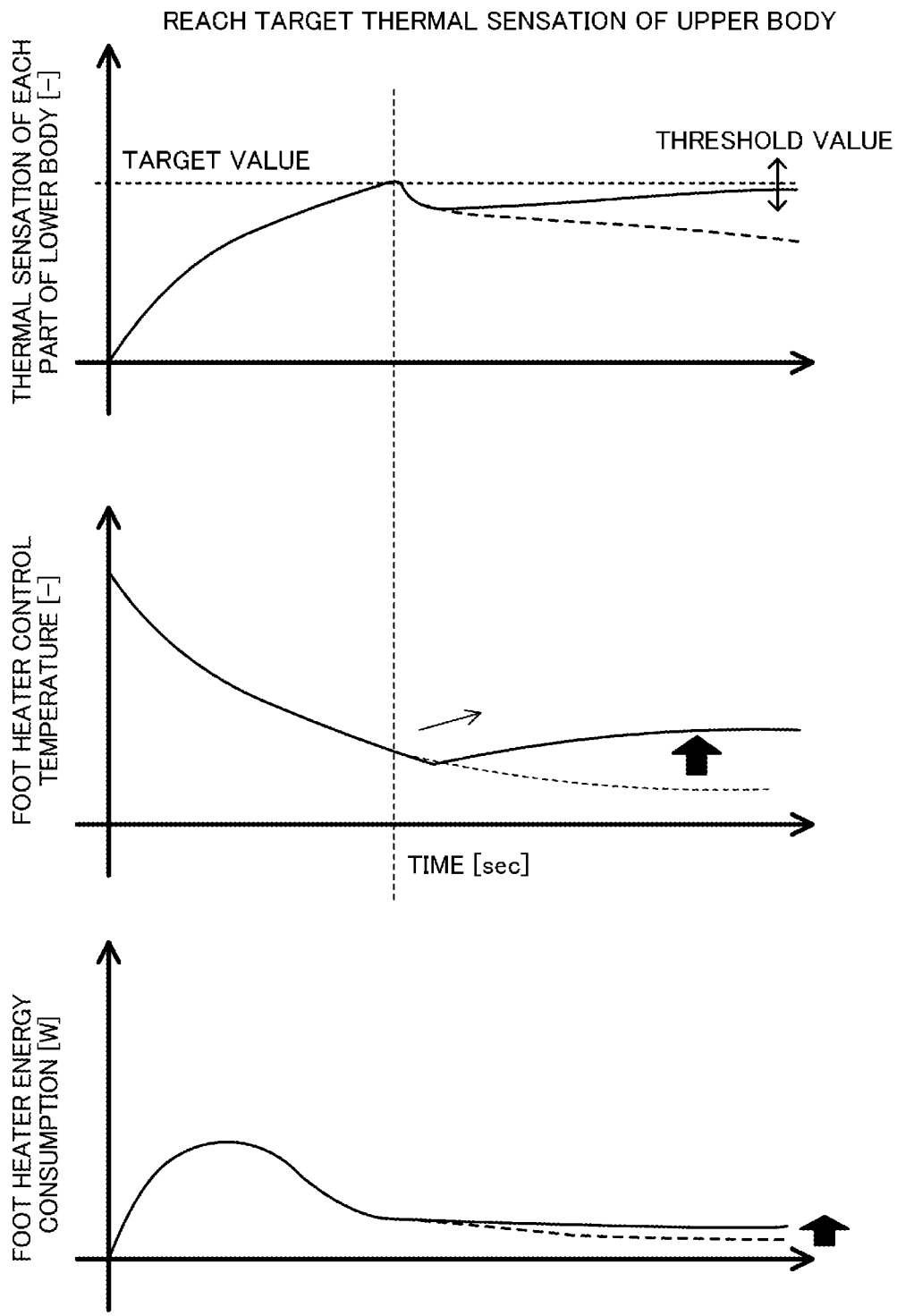
FIG. 13 is a graph illustrating control details for the foot heater.

As shown in the bottom graph of FIG. 13, while the foot heaters 30 is on, the foot heater energy consumption (the heating energy consumption of the auxiliary heater) increases until the thermal sensations of the lower body of the occupant A reach the respective target thermal sensations, and when the thermal sensations of the lower body of the occupant A approaches the respective target thermal sensations, the foot heater energy consumption decreases. When the thermal sensations of the lower body of the occupant A reach the respective target thermal sensations, the temperatures of the respective foot heaters 30 are raised as shown in the middle graph of FIG. 13. This temperature raising control for the foot heaters 30 is performed after the decrease in foot heater energy consumption shown in FIG. 13.

Specifically, the decrease in foot heater energy consumption shown in FIG. 13 means the decrease in heat input by the cabin air-conditioning unit 10, and by the decrease, the thermal sensations of the lower body of the occupant A decrease (the occupant A feels cold). Thus, by the temperature raising control for the foot heaters 30, the decrease in heat input by the cabin air-conditioning unit 10 can be compensated. This allows the occupant A to be avoided from feeling uncomfortable.

Further, if it is estimated that the occupant A feels hot at the lower body, the temperatures of the respective foot heaters 30 are lowered. Thus, the occupant A does not feel uncomfortable.

Figure 10:
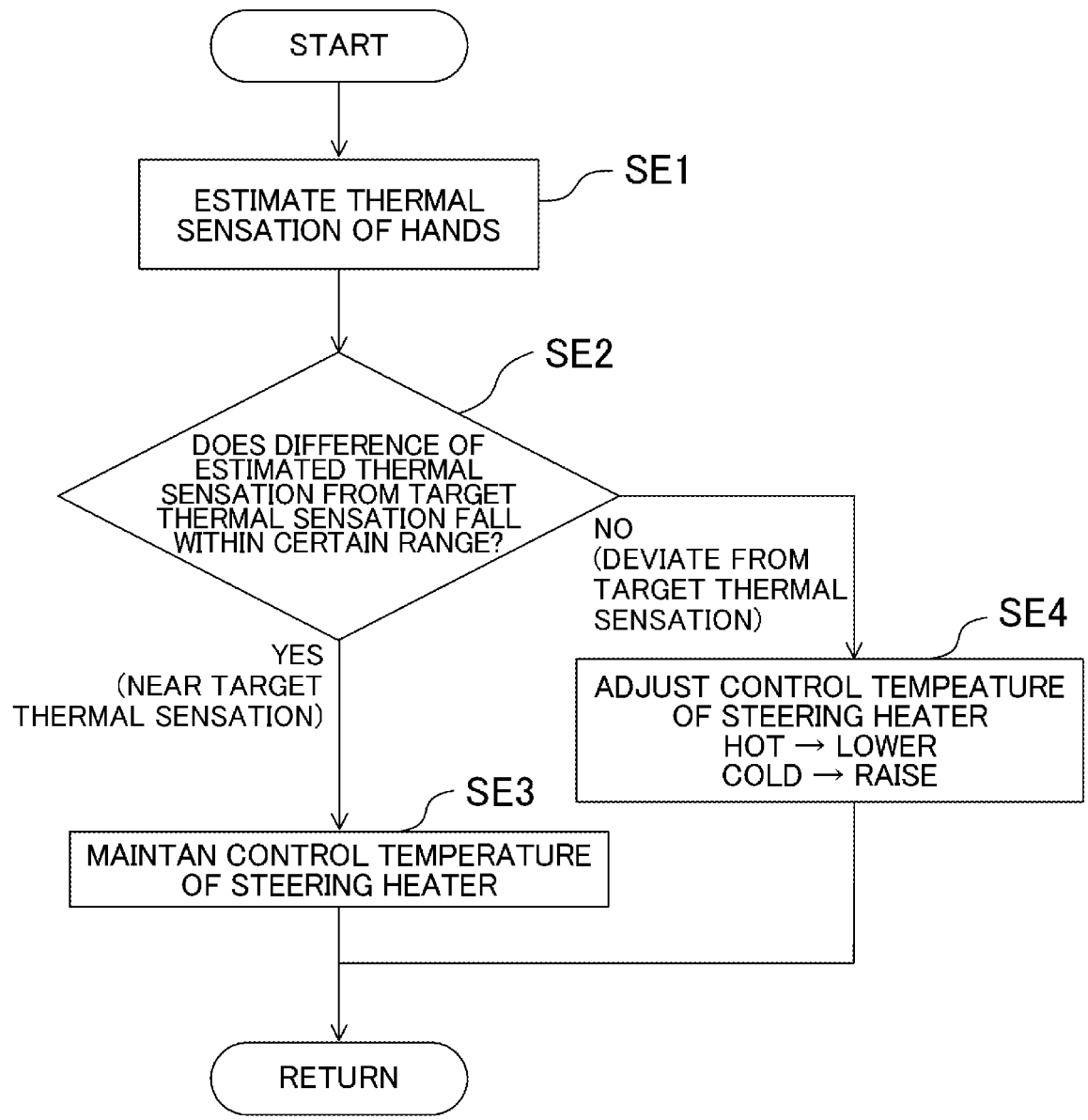
FIG. 10 is a flowchart illustrating control details for a steering heater.

Next, the control details for the steering heaters 104*a* will be described with reference to the flowchart shown in FIG. 10. In step SD1, the thermal sensations of the respective hands of the occupant A are estimated. The hands of the occupant A are indicated by the parts A9 and A10 shown in FIG. 2. These thermal sensations may be estimated based on the thermal sensations obtained by the occupant thermal sensation estimation unit 63. Further, although not indicated in the step, the target thermal sensations of the respective parts of the occupant A set by the target thermal sensation setting unit 62 are obtained.

In step SE2, it is determined whether or not the differences between the thermal sensations of the respective hands of the occupant A estimated in step SE1 and the target thermal sensations of the respective hands of the occupant A fall within a certain range. The differences within a certain range may be defined as, for example, about 1 as a numerical expression of the thermal sensations. If the estimated thermal sensations of the respective hands of the occupant A are near the target thermal sensations and the determination is YES in step SE2, i.e., the occupant A feels neither hot nor cold, the flow proceeds to step SE3 to maintain the current temperature of the steering heater 104a.

If the estimated thermal sensations of the hands of the occupant A deviate from the respective target thermal sensations and the determination is NO in step SE2, the flow proceeds to step SD4. Deviating may be defined as a difference of 2 or more as a numerical expression of the thermal sensation, the difference is a difference between the estimated thermal sensation and the target thermal sensation. In step SE4, the temperatures of the respective steering heaters 104a are adjusted. If the result of the determination in step SE2 estimates that the occupant A feels hot at the hands, the temperatures of the respective steering heaters 104a are lowered. If the result estimates that the occupant A feels cold at the hands, the temperatures of the respective steering heaters 104a are raised.

Figure 14:
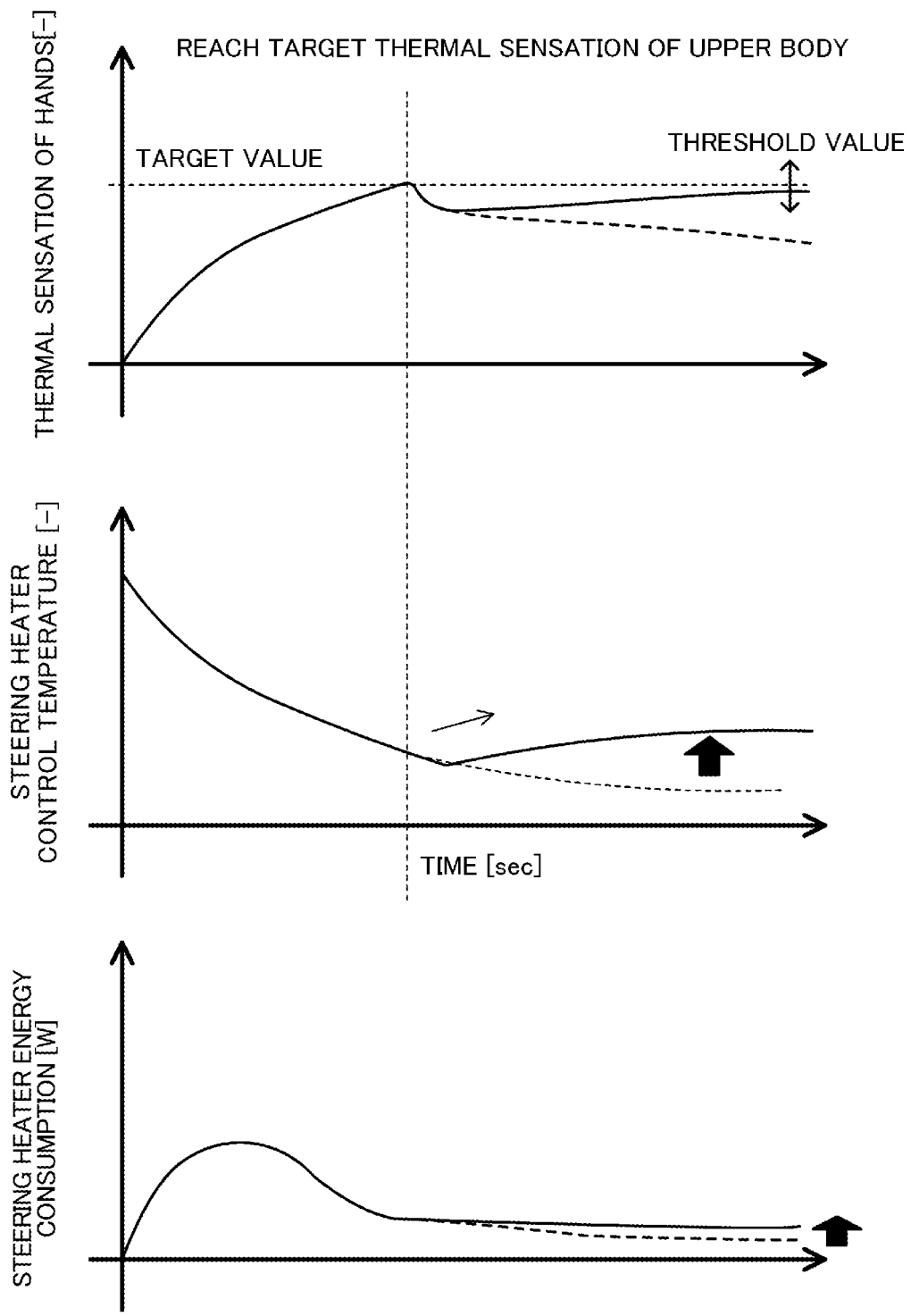
FIG. 14 is a graph illustrating control details for the steering heater.

As shown in the bottom graph of FIG. 14, while the steering heater 104a is on, the steering heater energy consumption (the heating energy consumption of the auxiliary heater) increases until the thermal sensations of the hands of the occupant A reach the respective target thermal sensations, and when the thermal sensations of the hands of the occupant A approaches the respective target thermal sensations, the steering heater energy consumption decreases. When the thermal sensations of the hands of the occupant A reach the respective target thermal sensations, the temperatures set for the steering heaters 104a are raised as shown in the middle graph of FIG. 14. This temperature raising control for the steering heaters 104a is performed after the decrease in steering heater energy consumption shown in FIG. 14.

Specifically, the decrease in steering heater energy consumption shown in FIG. 14 means the decrease in heat input by the cabin air-conditioning unit 10, and by the decrease, the thermal sensations of the hands of the occupant A decrease (the occupant A feels cold). Thus, by the temperature raising control for the steering heaters 104a, the decrease in heat input by the cabin air-conditioning unit 10 can be compensated. This allows the occupant A to be avoided from feeling uncomfortable.

Further, if it is estimated that the occupant A feels hot at the hands, the temperatures of the steering heaters 104a are lowered. Thus, the occupant A does not feel uncomfortable.

(Advantages of Embodiment)

As described above, the cabin temperature control unit 64 can individually control the cabin air-conditioning unit 10, foot heaters 30, seat heater system 40, and the steering heaters 104a so that the thermal sensations of the respective parts of the occupant A fall within the range of the respective target thermal sensations.

The cabin temperature control unit 64 may be configured to control the cabin air-conditioning unit 10, the foot heaters 30, the seat heater system 40, and the steering heaters 104a so that the sum of the heating energy consumptions detected by the heating energy consumption detection unit 65 becomes the lowest if the thermal sensations of the respective parts of the occupant A estimated by the occupant thermal sensation estimation unit 63 fall within the respective target thermal sensations set by the target thermal sensation setting unit 62. The estimated thermal sensations of the occupant A within the range of the target thermal sensations means that the occupant A feels comfortable. In this case, the outputs of the cabin air-conditioning unit 10, the foot heaters 30, the seat heater system 40, and the steering heaters 104 are lowered so that the sum of the heating energy consumptions becomes the lowest. When the decrease in the heating energy consumption through the decrease in output of the cabin air-conditioning unit 10 is larger than that by the decrease in outputs of the foot heaters 30 and the seat heater system 40, the output of the cabin air-conditioning unit 10 may be lowered.

In addition, the cabin temperature control unit 64 may be configured to control the cabin air-conditioning unit 10 so that the heating energy consumption of the cabin air-conditioning unit 10 decreases and to control the auxiliary heater so that the heating energy consumption of the auxiliary heater increases, if the thermal sensation of at least one part of the occupant thermal sensation estimation unit among the thermal sensations of the respective parts of the occupant A estimated by the occupant thermal sensation estimation unit 63 exceeds the range set by the target thermal sensation setting unit 62.

For example, after the initial mode of heating, the thermal sensation of at least one part of the occupant A may exceed the target thermal sensation. At this time, since the cabin R has been warmed up to some extent, the heating energy consumptions can be reduced while maintaining the target thermal sensations by actively using the auxiliary heater being the direct warmer or the radiant warmer, which more efficiently performs heating than heating by air-conditioned wind of the cabin air-conditioning unit 10.

The cabin temperature control unit 64 may be configured to control the cabin air-conditioning unit 10 and the auxiliary heater so that the thermal sensations of the distal parts from the outlets 102b and 102c fall within the range set by the target thermal sensation setting unit 62.

Specifically, the air-conditioned wind is more difficult to reach the distal parts from the outlets 102b and 102c than the near part among the parts of the occupant A, and thus, the thermal sensations of the distal parts tend to be lower. However, in this embodiment, the cabin air-conditioning unit 10 and the auxiliary heater are controlled based on the thermal sensations of the distal parts from the outlets 102b and 102c, thereby allowing comfort to be further enhanced without reducing the thermal sensation of any part.

The cabin temperature control unit 64 may be configured to control the cabin air-conditioning unit 10 and the auxiliary heater so that the thermal sensations of the near parts to the outlets 102b and 102c fall within the range set by the target thermal sensation setting unit 62.

Specifically, during the heating operation by the cabin air-conditioning unit 10, the thermal sensations of the near parts to the outlets 102b and 102c tend to be higher than those of the distal parts among the parts of the occupant A. However, in this embodiment, the cabin air-conditioning unit 10 and the auxiliary heater are controlled based on the thermal sensations of the near parts to the outlets 102b and 102c, thereby allowing comfort to be further enhanced without reducing the thermal sensation of any part.

The cabin temperature control unit 64 may be configured to control a volume of air-conditioned wind delivered from the cabin air-conditioning unit 10 in accordance with the thermal sensations of the distal parts from the outlets 102b and 102c, and control the temperature of the air-conditioned wind delivered from the cabin air-conditioning unit 10 in accordance with the thermal sensations of the near parts to the outlets 102b and 102c.

With this configuration, the volume of the air-conditioned wind is controlled in accordance with the thermal sensations of the distal parts from the outlets 102b and 102c, and the temperature of the air-conditioned wind is controlled in accordance with thermal sensations of the near parts to the outlets 102b and 102c among the parts of the occupant A. This allows the heating energy consumptions to be reduced while reducing variations of the thermal sensations of the parts.

Further, the occupant thermal sensation estimation unit 63 may be configured to individually estimate the thermal sensations of the upper body and the thermal sensations of the lower body, and the cabin temperature control unit 64 may be configured to changes the volume of the air-conditioned wind blowing out of vent outlets 102b and the heat outlets 102c in accordance with the thermal sensations of the upper and lower bodies of the occupant A estimated by the occupant thermal sensation estimation unit 63. With this configuration, the volume of air-conditioned wind blowing out of the vent outlets 102b may be set so that the estimated thermal sensations of the upper body of the occupant A reach the respective target thermal sensations, and the volume of air-conditioned wind blowing out of the heat outlets 102c can be set so that the estimated thermal sensations of the lower body of the occupant A reach the respective target thermal sensations. Specifically, this configuration allows the thermal sensations of the upper and lower bodies of the occupant A to be optimized by the volumes of the air-conditioned winds blowing out of the respective outlets 102 and 102c. This allows the heating energy consumptions to be reduced while reducing variations of the thermal sensations of the parts of the upper and lower bodies of the occupant A.

In addition, the cabin temperature control unit 64 may be configured to control the cabin air-conditioning unit 10 so that the temperature of the air-conditioned wind blowing out of the outlets 102b and 102c becomes equal to or higher than the estimated values of the skin temperatures. The estimated values of the skin temperatures can be obtained based on the output values of the skin temperature sensor 79, and the degree of opening of the air mixing damper 15 may be set so that the temperature of the air-conditioned wind becomes equal to or higher than the estimated values of the skin temperatures, thereby allowing comfortable thermal sensations to be maintained.

The embodiment described above is a mere examples in every respect, and shall not be interpreted in a limited manner. Variations and modifications of equivalents of the claims are all intended to fall within the scope of the present disclosure.

As can be seen from the foregoing description, the present invention is useful for a vehicle heater for an automobile or any other vehicle, for example.

What is claimed is:

1. A vehicle heater including a cabin air-conditioning unit configured to produce air-conditioned wind blowing out of an outlet in a cabin and to condition air in the cabin using the air-conditioned wind, the vehicle heater comprising:

an auxiliary heater including at least one of a direct warmer positioned to correspond to a part of an occupant in contact therewith and configured to directly warm the occupant, or a radiant warmer positioned to be apart from the occupant and configured to warm the occupant by radiant heat;

a cabin condition detector, including at least a sensor, configured to sense or estimate at least one cabin condition of a temperature condition inside the cabin, a humidity condition inside the cabin, an airflow condition inside the cabin, or a solar radiation condition inside the cabin; and a controller, including at least a processor and a memory, configured to:

detect operation states of the cabin air-conditioning unit and the auxiliary heater;

set target thermal sensations for a finite number of parts into which the occupant is virtually divided;

quantitatively estimate the thermal sensations of the respective parts of the occupant based on the cabin condition sensed or estimated, and the operation states of the cabin air-conditioning unit and the auxiliary heater detected; and individually control the cabin air-conditioning unit and the auxiliary heater so that the thermal sensations of the respective parts estimated fall within a range of the target thermal sensations set, wherein the parts include a near part to and a distal part from the outlet of the cabin air-conditioning unit, and the controller is further configured to control a volume of air-conditioned wind delivered from the cabin air-conditioning unit in accordance with the thermal sensation of the distal part from the outlet, and control a temperature of the air-conditioned wind delivered from the cabin air-conditioning unit in accordance with the thermal sensation of the near part to the outlet.

2. The vehicle heater of claim 1, further comprising:

a heating energy consumption detector, including at least a sensor, configured to detect heating energy consumptions of the cabin air-conditioning unit and the auxiliary heater, wherein the controller is further configured to control, if the thermal sensations of the respective parts estimated fall within the range set, the cabin air-conditioning unit and the auxiliary heater so that a sum of the heating energy consumptions detected by the heating energy consumption detector becomes the lowest.

3. The vehicle heater of claim 2, wherein the controller is further configured to control, if the thermal sensation of at least one part among the thermal sensations of the respective parts estimated exceeds the range set, the cabin air-conditioning unit so as to reduce the heating energy consumption of the cabin air-conditioning unit, and control the auxiliary heater so as to increase the heating energy consumption of the auxiliary heater.

4. The vehicle heater of claim 1, wherein the parts include the near part to and the distal part from the outlet of the cabin air-conditioning unit, and the controller is further configured to control the cabin air-conditioning unit and the auxiliary heater so that the thermal sensation of the distal part from the outlet falls within the range set.

5. The vehicle heater of claim 1, wherein the parts include the near part to and the distal part from the outlet of the cabin air-conditioning unit, and the controller is further configured to control the cabin air-conditioning unit and the auxiliary heater so that the thermal sensation of the near part to the outlet falls within the range set.

6. The vehicle heater of claim 1, wherein
the outlet of the cabin air-conditioning unit includes a lower-body-side outlet for allowing air-conditioned wind to blow toward a part of the lower body or the entire lower body of the occupant therethrough and an upper-body-side outlet for allowing the air-conditioned wind to blow toward a part of the upper body or the entire upper body of the occupant therethrough,
the controller is further configured to:
estimate thermal sensations of upper and lower bodies of the occupant, and
change volumes of air-conditioned winds blowing out of the upper-body-side outlet and the lower-body-side outlet in accordance with the thermal sensations of the upper and lower bodies estimated.

7. The vehicle heater of claim 1, wherein
the controller is further configured to estimate the thermal sensations of the respective parts of the occupant based on estimated values of skin temperatures of the respective parts of the occupant.

8. The vehicle heater of claim 1, wherein
the controller is further configured to estimate the thermal sensations of the respective parts of the occupant based on measured values of skin temperatures of the respective parts of the occupant.

9. The vehicle heater of claim 7, wherein
the controller is further configured to control the cabin air-conditioning unit so that the temperature of air-conditioned wind blowing out of the outlet becomes equal to or greater than the estimated values of the skin temperatures.

10. The vehicle heater of claim 1, wherein
the auxiliary heater is a seat heater system, which is incorporated into a vehicle seat and includes the direct warmer and the radiant warmer.

11. The vehicle heater of claim 10, wherein
the controller is configured to set respective output upper limit values for the direct warmer and the radiant warmer, and the output upper limit value of the direct warmer is lower than that of the radiant warmer.

12. A vehicle comprising the vehicle heater of claim 1.

* * * * *